(12) United States Patent
Carolan

(10) Patent No.: US 7,751,409 B1
(45) Date of Patent: Jul. 6, 2010

(54) LOGICAL SERVICE DOMAINS FOR ENABLING NETWORK MOBILITY

(75) Inventor: Jason T. Carolan, Superior, CO (US)

(73) Assignee: Oracle America, Inc., Redwood City, CA (US)

( * ) Notice: Subject to any disclaimer, the term of this patent is extended or adjusted under 35 U.S.C. 154(b) by 1717 days.

(21) Appl. No.: 10/925,325

(22) Filed: Aug. 23, 2004

Related U.S. Application Data

(63) Continuation-in-part of application No. 10/103,494, filed on Mar. 20, 2002, now abandoned.

(51) Int. Cl.
*H04L 12/28* (2006.01)

(52) U.S. Cl. .................. 370/395.53; 370/352; 370/353; 370/354; 370/395.3; 370/395.31; 709/204; 709/223; 709/229; 709/232; 709/238; 709/243; 709/249

(58) Field of Classification Search ......... 370/351–357, 370/395.52, 395.53, 395.3–395.31; 709/204, 709/223, 229, 232, 238, 243, 249
See application file for complete search history.

(56) References Cited

U.S. PATENT DOCUMENTS

| | | | |
|---|---|---|---|
| 6,205,465 B1 * | 3/2001 | Schoening et al. ......... 718/102 |
| 6,226,788 B1 * | 5/2001 | Schoening et al. ......... 717/107 |
| 6,526,052 B1 * | 2/2003 | Rijhsinghani et al. ....... 370/389 |
| 6,681,232 B1 * | 1/2004 | Sistanizadeh et al. .... 707/104.1 |
| 2002/0038253 A1 * | 3/2002 | Seaman et al. ................ 705/26 |
| 2003/0046390 A1 * | 3/2003 | Ball et al. .................... 709/224 |
| 2003/0140168 A1 * | 7/2003 | Peshkin et al. .............. 709/245 |
| 2003/0179775 A1 * | 9/2003 | Carolan et al. .............. 370/469 |
| 2003/0208596 A1 * | 11/2003 | Carolan et al. .............. 709/225 |
| 2004/0078469 A1 * | 4/2004 | Ishwar et al. ................ 709/227 |
| 2004/0230695 A1 * | 11/2004 | Anschutz et al. ............ 709/232 |
| 2006/0106585 A1 * | 5/2006 | Brown et al. .................... 703/1 |

* cited by examiner

*Primary Examiner*—Hemant Patel
(74) *Attorney, Agent, or Firm*—Marsh Fischmann & Breyfogle LLP; Kent A. Lembke

(57) ABSTRACT

A method, and corresponding system, for managing a service delivery network. The method includes steps to add a service to the network including receiving a request for a new service, such as a service provided by a service application. The request is processed to identify resources within the service delivery network for providing the new service including a host for running the service application. A container is provided on the host and is configured to encapsulate the service application. The method continues with establishing membership of the container in a virtual local access network, which includes configuring the container for data packet communications utilizing VLAN tagging.

20 Claims, 16 Drawing Sheets

LOGICAL SERVICE DOMAINS FOR ENABLING NETWORK MOBILITY

CROSS-REFERENCE TO RELATED APPLICATIONS

This application is a continuation-in-part of U.S. patent application Ser. No. 10/103,494, filed Mar. 20, 2002 now abandoned, and is related to U.S. patent application Ser. No. 10/136,412, filed May 1, 2002, both of which are incorporated herein by reference in their entirety.

BACKGROUND OF THE INVENTION

1. Field of the Invention

The present invention relates to information networks, and, more particularly, the present invention relates to information exchange networks that electronically deliver information, data, and service to end-users.

2. Relevant Background

Today's networks move information and services. As advances are made in existing and future technologies, the demand for information will increase. Network design and solutions may have to account for a large number of users, transactions, and diverse content types. The designs and solutions may result in a different approach than that of standard infrastructures. Networks should support convergent services with high reliability and performance, while maintaining manageability and security. Typical networks may be designed based on a client-server architecture. Client-server architecture can lead to network design being completed before the services architecture is complete, and may decrease flexibility for services within the network to support multi-tiered services.

Many technology companies concentrate on services to the end user, rather than the technology itself. Service-based architectures may be applications that are accessed over Internet protocol ("IP") networks, such as domain name systems ("DNS"), Web, file transfer protocol ("FTP"), telnet, and the like. Web servers provide the front-end access points to the desired applications. For future architectures, the applications may need to be redesigned to map into a new architectural shift. Upgrading software and hardware without downtime may be difficult and may result in a re-design of the system architecture to introduce new services. Challenges may include satisfying growth and a need for continuous availability.

Several factors may impact future computing platforms and services delivered by service providers, such as bandwidth availability and growth, wireless services, disaster recovery and services, computer processing growth, and the like. These implications enhance the need for scalable, secure, and high performance network topologies. Service provider data centers, such as Internet data centers, may be challenged to satisfy the growth of services and the desire for continuous availability. Thus, future network designs should account for network infrastructure to distribute data between the server instances.

There remains a need for methods and systems for providing services in distributed computing networks that allow both services and the hardware components used to provide services to be modified, reorganized, added, and deleted efficiently, cost effectively, securely, and, preferably, remotely without manual re-cabling of the network components.

SUMMARY OF THE INVENTION

To address the problems with prior service delivery technologies, the invention provides methods and systems to support dynamic provisioning and virtualization of services and service domains. According to this aspect of the invention, logical service domains (LSDs) are provided within a service delivery network (SDN). LSDs are configured with a logical construct that breaks physical barriers or restraints that may be associated with "standard" service domains. One feature of the LSDs of the invention is the use of resource encapsulation with containers or similar technologies. With the use of resource encapsulation, logical service domains or LSDs enable a SDN to be configured for many hosts to many servers. Readily mobile services are provided by tying the use of VLAN tagging to the logical construct of containers rather than to a physical port or device. Further, provisioning technologies can be implemented within an LSD-based SDN to automate the addition and distribution of services based on demand, user requests, and other factors.

More particularly, a service delivery network is provided for delivering two or more services, such as with applications, in two or more logical service domains. The network includes a first application configured to provide a first service and a second application configured to provide a second service. A pair of servers, such as a host server and a dedicated server, is provided for each of the applications to run the applications to provide the service. Containers are provided on each of the servers to contain or encapsulate the first and second applications. A switch is interposed between each of the pairs. A first virtual local access network (VLAN) is provided that includes the containers containing the first application and the switch as members, and a second VLAN is provided that includes the containers containing the second application and the switch as members. The VLANs and their members are typically configured for VLAN tagging and are not port-based VLANs. The service delivery network may also be configured for one service or service domain to many, and the VLANs can be tagged or not tagged (i.e., port based), with provisioning via the network in any of these configurations.

According to another aspect of the invention, a method for adding a service to a service delivery network is provided that includes receiving a request for a new service in a service delivery network. The service is often provided by a service application. The method further includes processing the request to identify resources within the service delivery network for providing the new service including a host for running the service application. A container is provided on the host and is configured to encapsulate the service application. The method continues with establishing membership of the container in a VLAN, which includes configuring the container for data packet communications utilizing VLAN tagging.

DETAILED DESCRIPTION OF THE INVENTION

The following description explains the features and operations of service delivery networks (SDNs) that are created and configured according to the present invention. As will become clear, SDNs facilitate the separation of services within a data communications network based on their business and technical function(s). In this regard, the following description first explains a feature of the invention labeled "service domains" that are used to separate such services on these functional bases, such as by providing a separate service domain for a database, for a web server, and the like. The configuration of a SDN with service domains provides both scalability and security as the SDN designers and operators are able to dial in or tune to specific services provided by the service domains (such as through applications running within the service domain) over the SDN while disabling other services. The use of SDNs according to the invention further enables a distributed security model that has the ability to implement reinforcing security mechanisms based on acceptable levels of risks for each of the services provided by the service domains in the SDN.

In some embodiments, the service domains are hardwired or cabled such as with separate switches and/or are arranged in port-based virtual local access networks (VLANs). These hardware-based embodiments are described first in the following description with reference to FIGS. 1-11. In other embodiments, "logical service domains" or LSDs are implemented within SDNs of the invention to support dynamic provisioning and virtualization. The use of LSDs enable services to be provisioned remotely and with soft-cabling of applications in "containers" which significantly reduces the costs of provisioning services in a network. For example, the LSDs can be configured to follow the service domain model explained with reference to FIGS. 1-11 but implement the model using VLAN tagging features within network interfaces and switching components. The features and operations of SDNs utilizing LSDs are explained below with reference to FIGS. 12-16.

Figure 1:
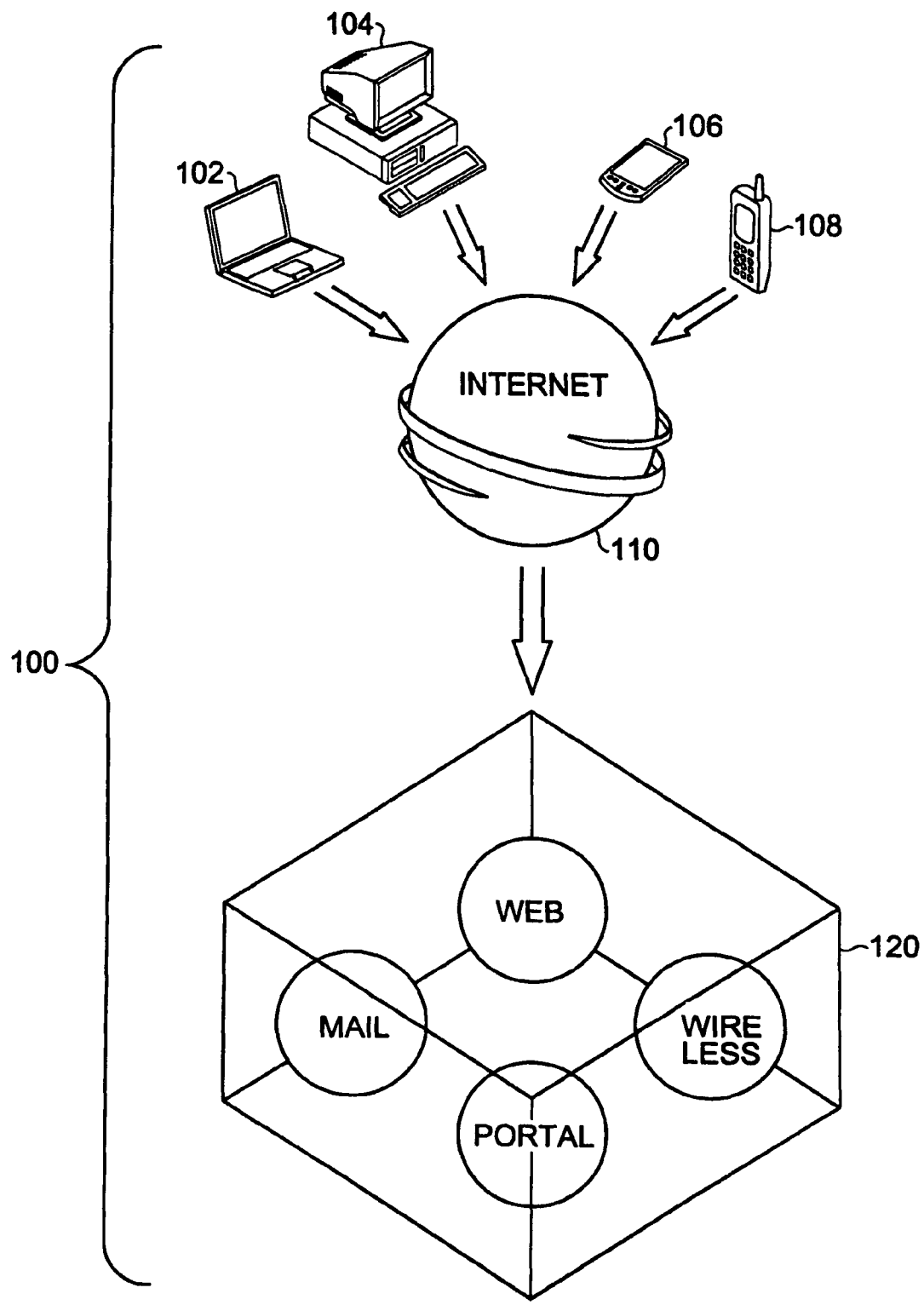
FIG. 1 illustrates a network in accordance with an embodiment of the present invention.

FIG. 1 depicts a network 100 in accordance with an embodiment of the present invention. Network 100 may be any network capable of transferring data and information from one component to another. Network 100 also may deliver requested services to end-users connected to network 100. For example, network 100 may include laptop 102, desktop 104, personal digital assistant ("PDA") 106, and wireless telephone 108 that are linked to Internet 110. These components may send and receive information from each other, or from other sources. Each component may receive information and data over Internet 110 in a known manner.

Internet 110 may be coupled to data centers. Specifically, Internet 110 may be coupled to service delivery network ("SDN") 120. Internet 110 also may be coupled to other SDNs and data centers. Internet 110 may be coupled to a plurality of SDNs 120. SDN 120 is a data services platform for scalable data centers. The services provided over network 100, and supported by SDN 120, may include end-user, supporting, and infrastructure. Services are products or resources offered over a network to meet or to provide specific business requirements and may be categorized in different ways. According to the disclosed embodiments, services may indicate products or resources from an end user perspective.

End-user services may be provided directly to an end-user, and may include a Web site, email capability, Usenet services, and the like. Supporting services may support end-user services. Supporting services may include an application server providing dynamic content for a Web site or e-commerce application. The end-user service, however, is the service access point, and users should not directly initiate connections into a supporting service. Infrastructure services may ease internal operations and support, and may include system and network management services. An example of an infrastructure service may be an internal DNS service. Infrastructure services should not interact directly with end-user services.

SDN 120 may focus on the services delivered to the end-user, as opposed to technology, servers, or other components of network 100. Thus, SDN 120 may be known as a service-driven network. Alternatively, SDN 120 may focus on these issues in addition to delivered services. SDN 120 may be known as a client-service architecture in that the client connects to a service and not directly to a server. A user, or client, may not be interested in connecting to a specific server, but, instead, desires to connect to a requested service. SDN 120 can focus on the service for a highly scalable, module-based network topology that may grow as services grow, while keeping security and flexibility intact. Referring to FIG. 1, SDN 120 may provide mail, Web, portal, and wireless services to the components coupled to Internet 110. These services may be supported by their own architectures, as disclosed in greater detail below.

SDN 120 may support unified service data centers. As services and providers continue to converge and provide different types of services, SDN 120 may provide increased speed, increased bandwidth-capable solutions with increased availability and flexibility. SDN 120 also promotes a client-service architecture that focuses on the services delivered to the customer, as opposed to servers. The customer, for example, may use laptop 102, desktop 104, PDA 106, or telephone 108, as disclosed above to access the services supported by SDN 120. SDN 120 may take advantage of a true service-driven architecture by virtualizing the servers and understanding the core services offered to the end user and data center services.

SDN 120 is a modular architecture that scales by adding computer processor units ("CPUs") in servers, adding servers, adding modules, adding instances of an application, and the like. SDN 120 may be scaled in every aspect and may meet the demands for future growth. SDN 120 enables servers to be consolidated by using technologies in the architecture that receive increased utilization from every server.

Within SDN 120, integration points may be standardized in a secure and manageable manner. This feature may increase system and network management integration, and enables SDN 120 to maintain a consistent qualifying of service expectations for the service delivery. In addition, future data centers may demand architectures that keep the same structure, even if the hardware, software, or traffic pattern changes. An increase or decrease of services, servers, and applications may be supported. SDN 120 may support this flexibility with minimal or no service interruption.

SDN 120 may use a highly-scalable network topology that utilizes integrated load balancing and high-speed routing. SDN 120 also may include a services focus, intelligent service routing, integrated security, and modular design. These features allow SDN 120 to deliver services to an end-user in a more efficient and timely manner. Service delivery can be the priority of SDN 120 because end-users want their requested services in a timely manner. SDN 120 allows for emphasis on the services, and not the hardware. Concentrating on service delivery allows the customer to determine specific systematic or service qualities requirements for each service. The qualities may include availability, security, and performance.

SDN 120 also includes intelligent service routing, or service routing and load balancing, features that are available throughout the architecture. Services may be routed according to server availability or application information, such as session identification or content, or according to load characteristics, such as the least amount of connections. In addition, based on the implementation, bandwidth management capabilities may allow for higher quality of service levels for specific services.

SDN 120 also may feature integrated security. Security capabilities may be provided throughout the architecture, thereby protecting the servers, network hardware, and the data. Security may be provided at increased, or high, speeds and with low latency, while protecting the customer's valuable networked resources.

SDN 120 may be comprised of modules. Some of the modules may be needed, and others may be optional. Using modular design, SDN 120, and network 100, may be extended and expanded to meet changing service requirements. For example, SDN 120 may provide the foundation of network 100 for a multi-customer IDC that allows each customer to determine specific security or performance requirements.

SDN 120 may utilize service modules and distribution modules. SDN 120 may be built on service modules. Various layers within a service module provide the service address, ISR or distribution, and integration desired for SDN 120. These functions may be provided by the network hardware that is supported in SDN 120. Distribution modules may provide service expandability. After capacity has been reached within a single service module, a distribution module and additional service modules may be added to SDN 120. This feature allows for maximum flexibility and scalability of SDN 120. Service and distribution modules are disclosed in greater detail below. Thus, SDN 120 may comprise several modules and service domains. The modules and domains work together to provide the production service delivery platform and features that allow intelligent service routing within network 100.

Figure 2:
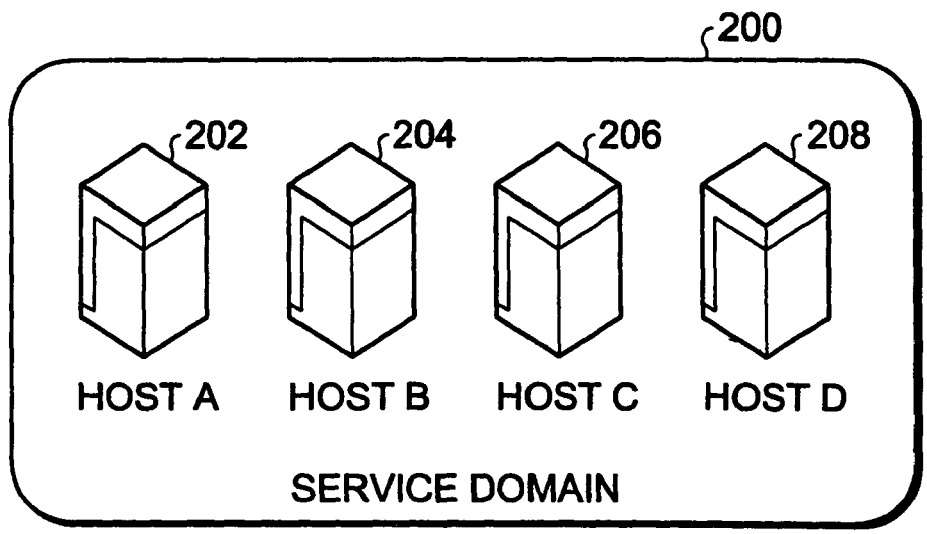
FIG. 2 illustrates a service domain in accordance with an embodiment of the present invention.

FIG. 2 depicts a service domain 200 in accordance with an embodiment of the present invention. Service domain 200 may be one of many service domains within a SDN, such as SDN 120. Service domain 200 is a logical grouping of related services and the hosts that provide these services. Service domain 200 comprises hosts including network appliances, and network access including gateways and access routers. For example, service domain 200 may comprise network appliances, such as servers 202, 204, 206, and 208. Services within an SDN, such as SDN 120, may be split into service domains, such as service domain 200. The services may be split according to several factors, such as logical groups, security requirements, ease of maintenance, load balancing, and the like. Members of service domain 200 should not require load balanced access to other members of service domain 200. By separating services into logical domains, an additional scalability mechanism is provided and enables services to take advantage of other service domains. For example, services may be comprised of service components. Service components, when placed together, provide the service. A service such as "email" may comprise three service components, such as receiving, composing, and sending emails.

Logical groups may influence the services for service domain 200. For example, front-end email proxy services that include POP or IMAP may belong in the same service domain. Further, hosts, and their services, in service domain 200 should have the same security requirements to ease configuration requirements, as disclosed in greater detail below. In addition, an SDN, such as SDN 120, is simpler to design and maintain if the services are limited in service domain 200. For example, if service domain 200 offers HTTP, it may be easier to limit traffic to a single protocol. If services are desired internally, and should be load balanced, then the services should be in separate service domains. The traffic within the SDN can follow the intended load distribution.

Service domain 200 is a physical network segment, or broadcast domain. The servers 202-208 belonging to a particular service domain should belong to the same physical network. Service domain 200 may be outfitted with private, unrouted addresses. Because the address is not routed on the Internet, the address also assists in securing the servers, or hosts, and network devices. Scalability also is provided as the addresses should not be used up by a network. With private addresses unrouted through the Internet being used for each server, or host, connected to the network, a mechanism may be desired to provide publicly routed addresses when appropriate. Public services may be configured with Internet protocol ("IP") addresses and may be called virtual servers, service access points ("SAP"), or virtual IP ("VIP") addresses. Public may apply to any routable network. The VIPs operate in conjunction with the load balancing system disclosed below and offer load distribution and network address translation.

Figure 3:
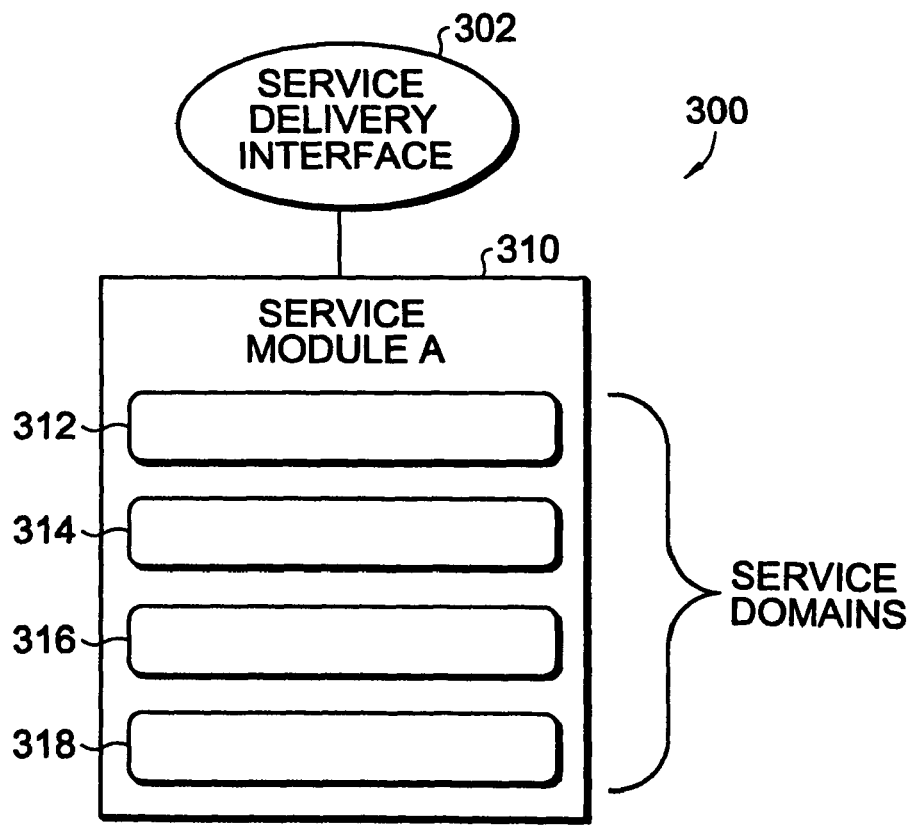
FIG. 3 illustrates a service module within a service delivery network in accordance with an embodiment of the present invention.

FIG. 3 depicts a service module 310 within a service delivery network 300 in accordance with an embodiment of the present invention. SDN 300 may correlate to SDN 120 of FIG. 1. Service module 310 is the basic building block within an SDN, such as SDN 120. Service module 310 may comprise physical network hardware, server connections for the production networks, and the software applications that comprise the services to be delivered. Service module 310 provides the services, the physical access, the routing, the distribution, the availability features, and the integration to other networks and network services. A service module may exist as a standalone component, or it may be linked together and scaled to provide virtually unlimited services.

Service module 310 also may comprise services that are separated into service domains 312, 314, 316, and 318. Service module 310 may support several service domains, and is not limited to the number depicted in FIG. 3. The following factors may determine, in addition to those disclosed with reference to service domain 200, how services are assigned, such as the services and their protocols, the requirement for services to communicate with other services, security requirements for the service, and the like. Thus, each service domain, such as service domain 312, provides a specific service, such as a wireless application protocol ("WAP") gateway functionality. This feature allows each service to be scaled individually, which increases flexibility within SDN 300. As services are added to service module 310, new service domains are created and attached to the existing configuration. This feature increases network scalability. Further, the network hardware may perform some of the functions provided traditionally by firewalls.

Service delivery interface 302 is the primary service interface. Service delivery interface 302 may provide the integration point to upstream access providers or wide-area network ("WAN") access. Service delivery interface 302 may not be considered a component of SDN 300. Alternatively, service delivery interface 302 may be part of SDN 300. The requirements for integration are based on the physical connections of the load balancing switch ("LBS") and the basic requirements for network access, including IP routing. Availability and link redundancy may be provided by a variety of protocols. Virtual router redundancy protocol ("VRRP") is preferred with static routing from the core router or switch to SDN 300. Other protocols, such as BGP, may be used as well. Convergence time, however, may be higher.

Figure 4:
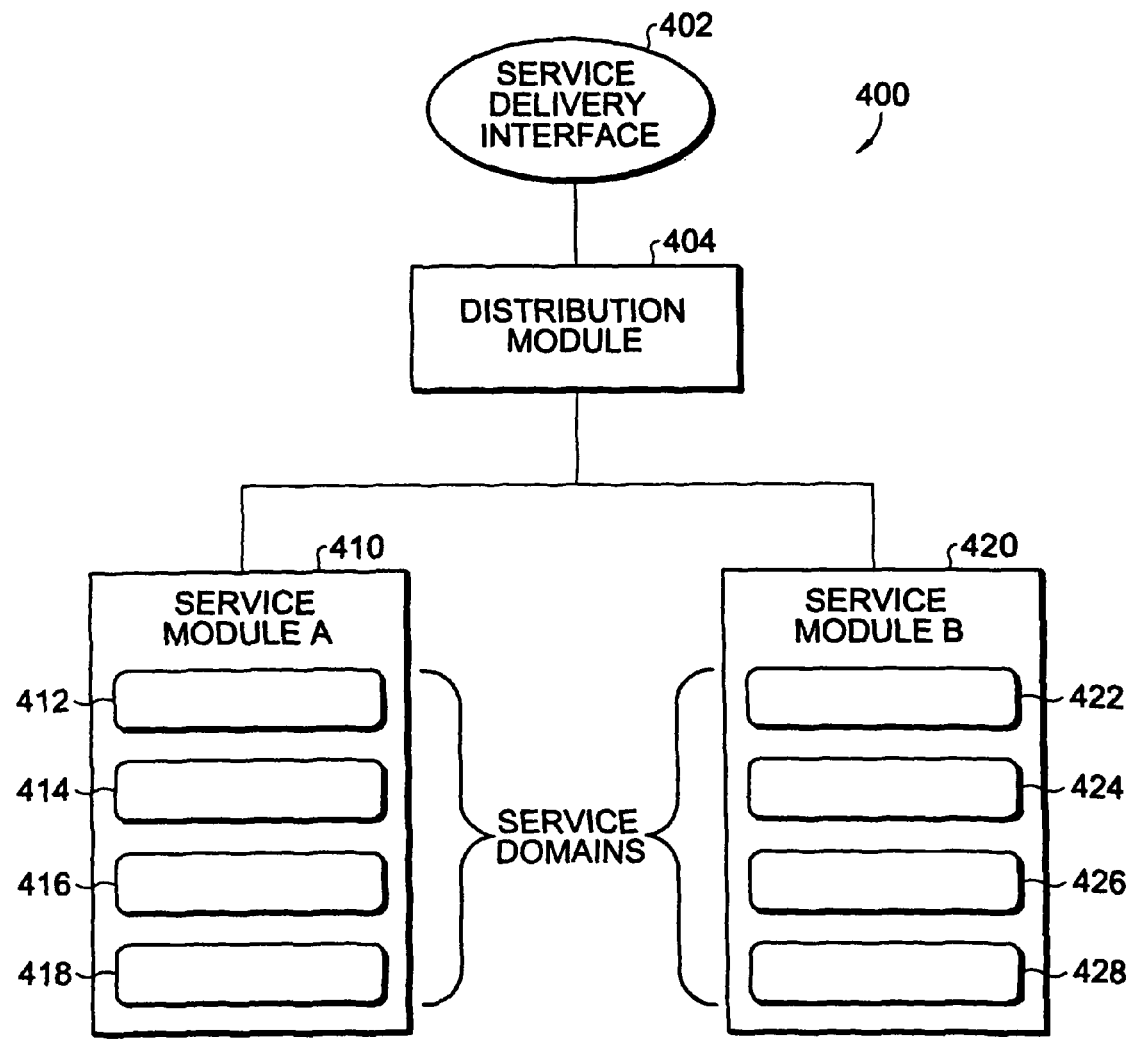
FIG. 4 illustrates distribution and service modules within a service delivery network in accordance with another embodiment of the present invention.

FIG. 4 depicts distribution and service modules within a service delivery network 400 in accordance with another embodiment of the present invention. SDN 400 correlates to SDN 300, but differs in configuration. The features disclosed with reference to FIG. 3 also may apply to SDN 400. SDN 400 couples to service delivery interface 402 that provides an integration point to upstream access providers. SDN 400 also includes service modules 410 and 420. Service module 410 may comprise service domains 412, 414, 416, and 418. Service module 420 may comprise service domains 422, 424, 426, and 428. As disclosed above, the service domains may provide different services on service modules 410 and 420.

SDN 400 also includes distribution module 404. Distribution module 404 comprises similar network components as service modules 410 and 420. Distribution module 404 enables several service modules to work together and aggregate services to service delivery interface 402. Distribution module 404 may be desired for large-scale implementations with different offered services and to integrate multiple service modules. Distribution module 404 also may support limited services, such as SDN-wide caching, global server load balancing for multi-site HA, DNS, and the like. Otherwise, all other services should be provided by service module 410 or 420.

Using distribution module 404, additional service modules may be attached to SDN 400. As demands for services increase, the growth may be accommodated by adding the services as service domains. Certain service domains, and their corresponding services, may want increased security or operate according to a different protocol from existing service modules 410 and 420. Thus, a new service module may be added to SDN 400. Interaction between service delivery interface 402 and existing service modules 410 and 420 may facilitated by distribution module 404.

Figure 5A:
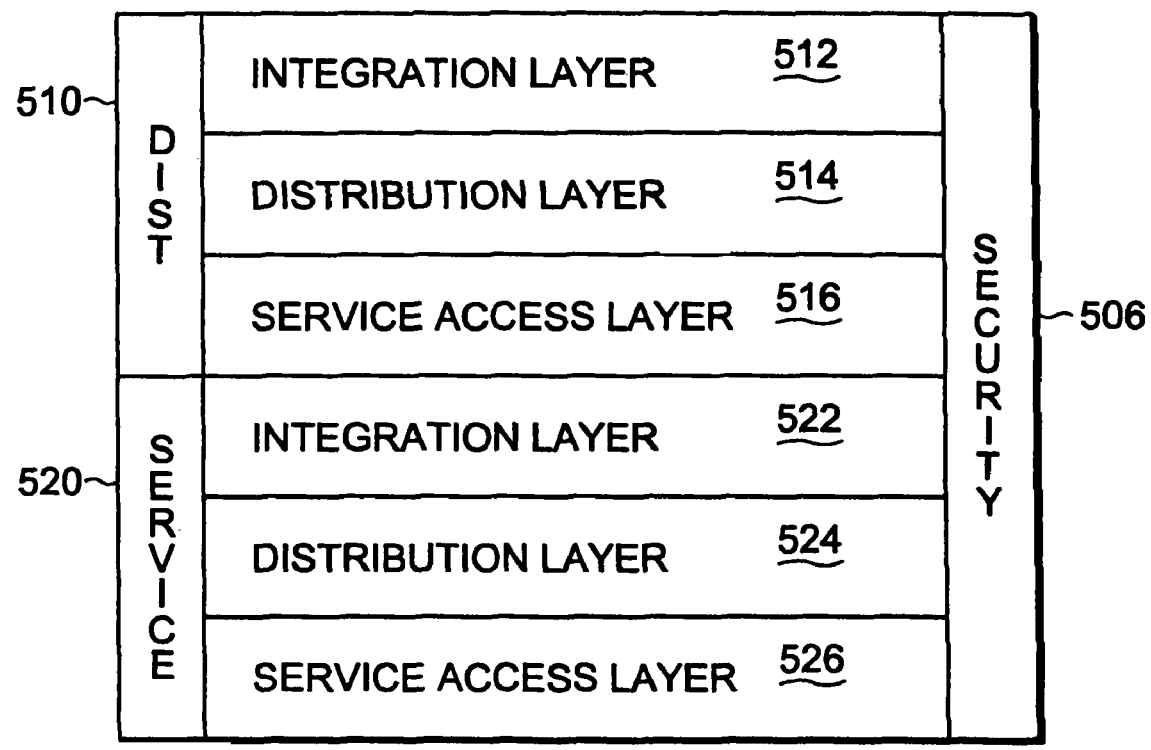
FIG. 5A illustrates functional layers of a distribution module and functional layers of a service module in accordance with an embodiment of the present invention.

FIG. 5A depicts layers of a distribution module 510 and layers of a service module 520 in accordance with an embodiment of the present invention. Distribution module 510 may include integration layer 512, distribution layer 514, and service access layer 516. Service module 520 may include integration layer 522, distribution layer 524, and service access layer 526. Security layer 506 encompasses distribution module 510 and service module 520, and provides security for the different services within each module.

Integration layers 512 and 522 are provided by the service delivery interface, such service delivery interface 402. Integration layers 512 and 522 provide the physical connectivity and availability features to hosts, other network devices, and other networks. Integration layers 512 and 522 also host the services provided by the underlying infrastructure supporting distribution module 510 and service module 520.

Distribution layers 514 and 524 provide routing, distribution, public service presentation, and other features for distribution module 510 and service module 520, respectively. Service access layers 516 and 526 provide the interface between distribution layers 514 and 524, the service instances, and the physical components within the network architecture, including the various modules that comprise the SDN, such as SDN 400.

Figure 5B:
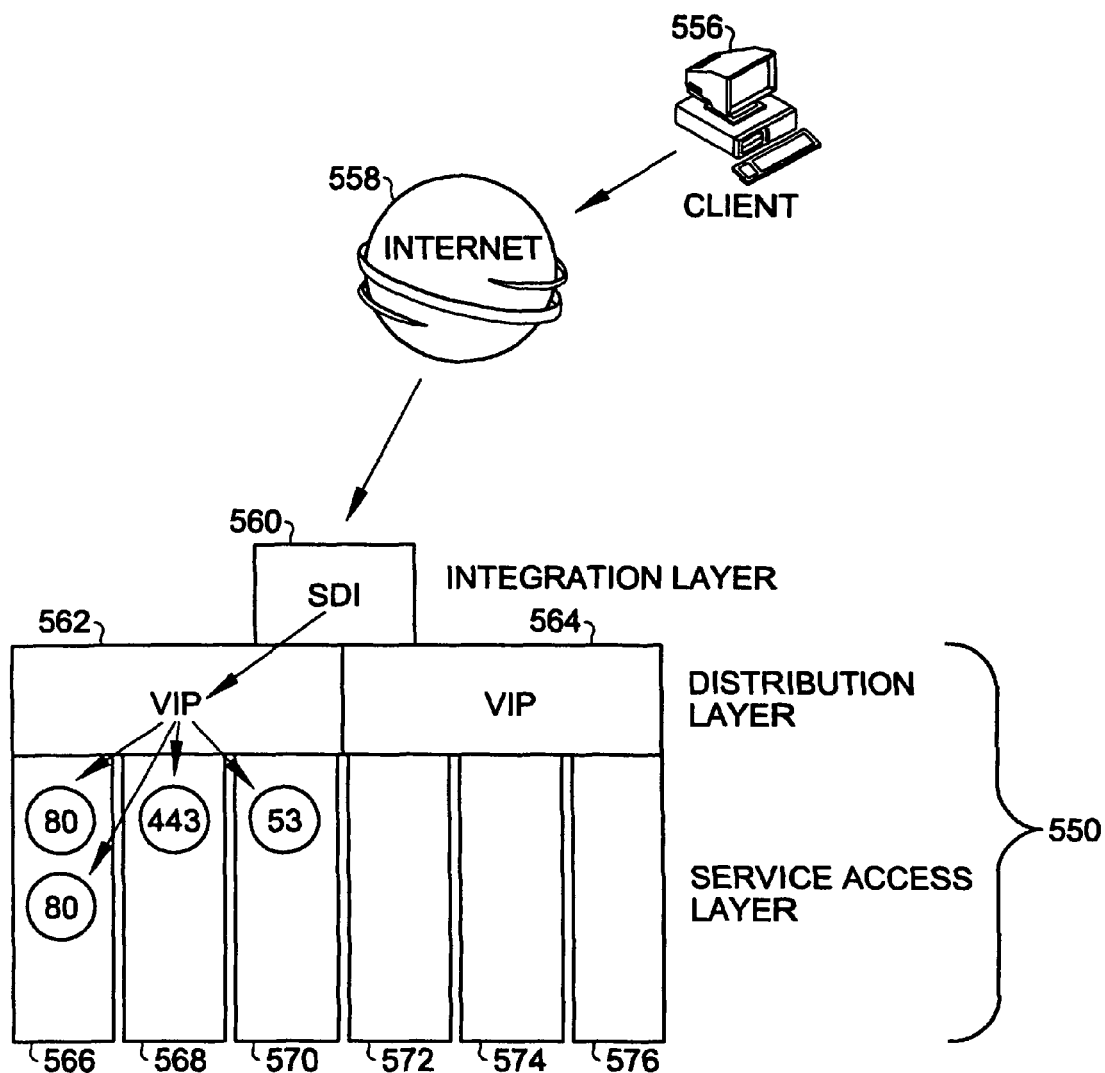
FIG. 5B illustrates routing through the functional layers of a service delivery network in accordance with an embodiment of the present invention.

FIG. 5B depicts routing through the functional layers of a service module 550 in accordance with an embodiment of the present invention. The functional layers depicted in FIG. 5B correlate to the functional layers in FIG. 5A. A client 556 requests a service to be provided by service module 550. The request may be in the form of a data packet. Client 556 is linked to a large network, such as Internet 558, to deliver the request to a service delivery network supporting service module 550. The request is routed by SDI 560, which interacts with the integration layer of service module 550.

Service module 550 includes service domains 566 and 576. Service domains may be identified for routing purposes by virtual IP 562 and 564. The distribution layer of service module 550 routes the received packets to the appropriate service domain according to the virtual IP 562 and 564. This process is disclosed in greater detail below. The virtual IP may not match the physical address of the corresponding service domain. The packet is routed according to the service requested or desired, and that service should be provided by the service domain that is identified by the integration layer of service module 550.

The service access layer of service module 550 may be represented by the services within service domains 566 and 576. For example, service domain 566 may include service 80. Service domain 568 may include service 443. The services may correspond to a host or server physically located with the service domain. The services further may be defined by ports corresponding to the servers within the service domains. For example, service domain 566 may have ports to route the data packet from client 556 after being processed by the distribution layer. According to FIG. 5B, two data packets may identify service 80 and are routed to port 80. Other data packets may identify services 443 and 53 and may be routed to ports 443 and 53, respectively.

Thus, client 556 may request a service by sending a data packet over Internet 558. The data packet is routed to the appropriate service according to the virtual IP of the service domains within the service module of a service delivery network.

Figure 6A:
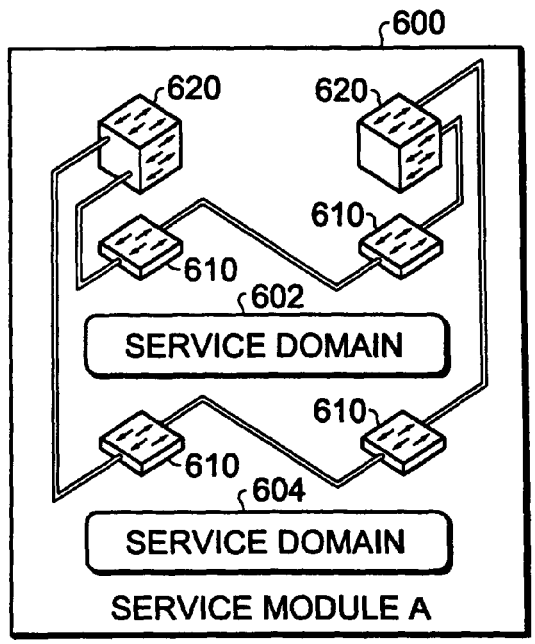
FIG. 6A illustrates a network configuration within a service module in accordance with an embodiment of the present invention.

FIG. 6A depicts a network configuration within a service module 600 in accordance with an embodiment of the present invention. Each service module and distribution module of the disclosed embodiments may be comprised of common network equipment. The network equipment may include load-balancing switches ("LBSs") and host connection switches ("HCSs"), as disclosed in greater detail below.

Service module 600 may comprise service domain 602 and service domain 604. Service module 600 also may comprise HCSs 610. HCSs 610 may provide simple functions to service module 600. HCSs 610 may attach hosts and servers within service domains 602 and 604 to an external or SDN network. Each host and server is expected to have at least two connections to meet customer requirements for high availability. Having two connections prevents the host connection to fail during a switch failure. A set of HCSs should be available for each service domain offered. HCSs 610 also may be used to link service modules together when utilizing a distribution module. HCSs 610 may be basic, high-speed, second generation, non-blocking, layer 2 switches. Alternatively, HCSs 610 may be any device or component that achieves the above-disclosed functionality within service module 600. HCSs 610 provide cost effective scalability of the features provided by LBSs 620, while also providing the features disclosed above. As service domains are added to service module 600, HCSs may be used to promote connectivity for the added service modules.

LBSs 620 may be key components within the network design. LBSs 620 offer most of the functional capabilities disclosed above. LBSs 620 should be scalable, feature-rich, high-speed, high-performance switches that are used within service module 600. LBSs 620 may provide routing between and to service domains 602 and 604. LBSs 620 may provide increased availability and distributed access to services within service module 600. LBSs 620 may be high-speed, high-performance switches used in an available design. Accordingly, LBSs 620 may replace layer 3 switches and routers in a traditional data center access network topology. LBSs 620 also may provide layer 3 through 7 switching, distribution, and load-balancing capabilities that may be desired for intelligent service routing. LBSs 620 and HCSs 610 can be switches that are provided by a network vendor. Each network vendor should have chassis-based and stackable-based configurations depending on the configuration design of the applicable SDN.

Figure 6B:
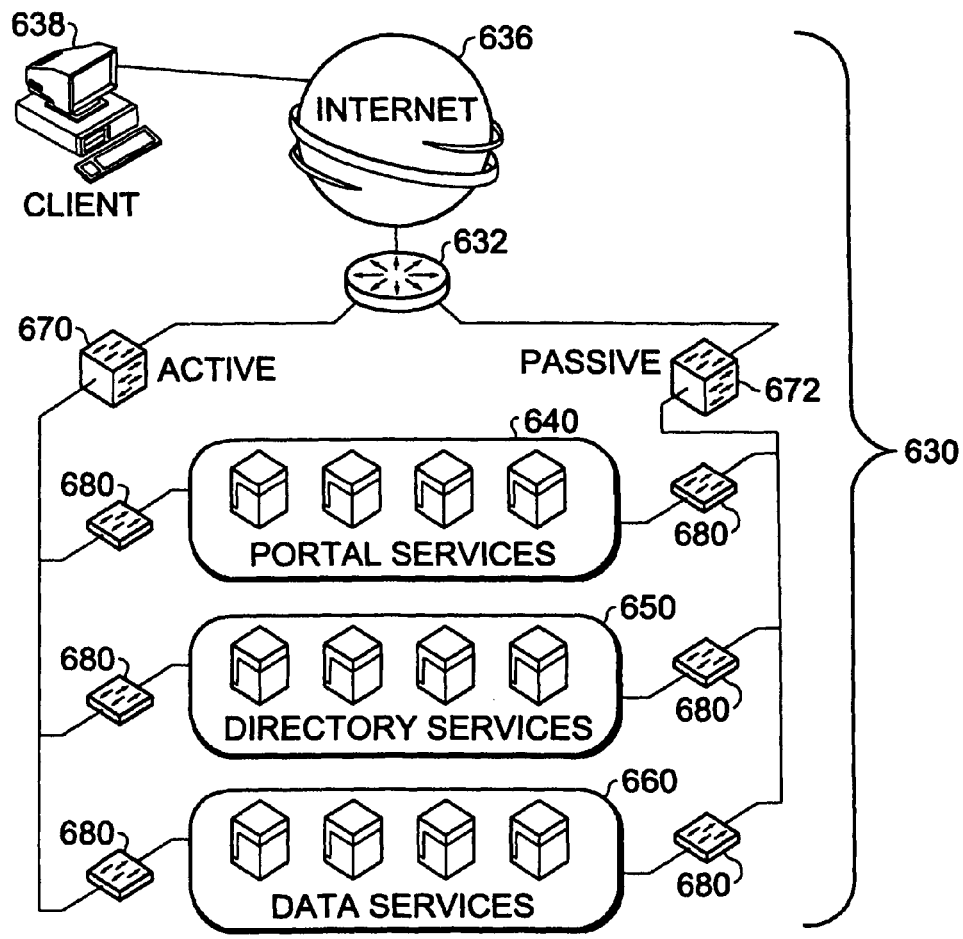
FIG. 6B illustrates a network configuration within a service delivery network in accordance with an embodiment of the present invention.

FIG. 6B depicts a network configuration within a service delivery network 630 in accordance with an embodiment of the present invention. SDN 630 may be coupled to a network via Internet 636 to client, or end-user, 638. SDN 630 provides services to client 638, as defined by the service modules and service domains within SDN 630. In this instance, SDN 630 may provide portal services, directory service, and data services from service domains 640, 650, and 660, respectively. Access to SDN 630, and service domains 640, 650, and 660 from Internet 636 may be through interface 632. Interface 632 may provide security and access functions to SDN 630, as disclosed above with reference, for example, to service delivery interface 402.

Service domains 640, 650, and 660 may be in a single service module, or may be in separate service modules. Further, service domains 640, 650, and 660 comprise servers to enable the functions disclosed above. For example, service domain 640 may include four servers that support portal services for SDN 630.

SDN 630 also includes HCSs 680 and LBSs 670 and 672. These switches may correspond to HCSs 610 and LBSs 620 disclosed above. HCSs 680 may connect service domains 640, 650, and 660 to SDN 630, or, alternatively, directly to the network supported by Internet 636. HCSs 680 may link service domains 640, 650, and 660 to each other. LBS 670 may be an active load balancing switch and LBS 672 may be a passive load balancing switch within. SDN 630.

Figure 7:
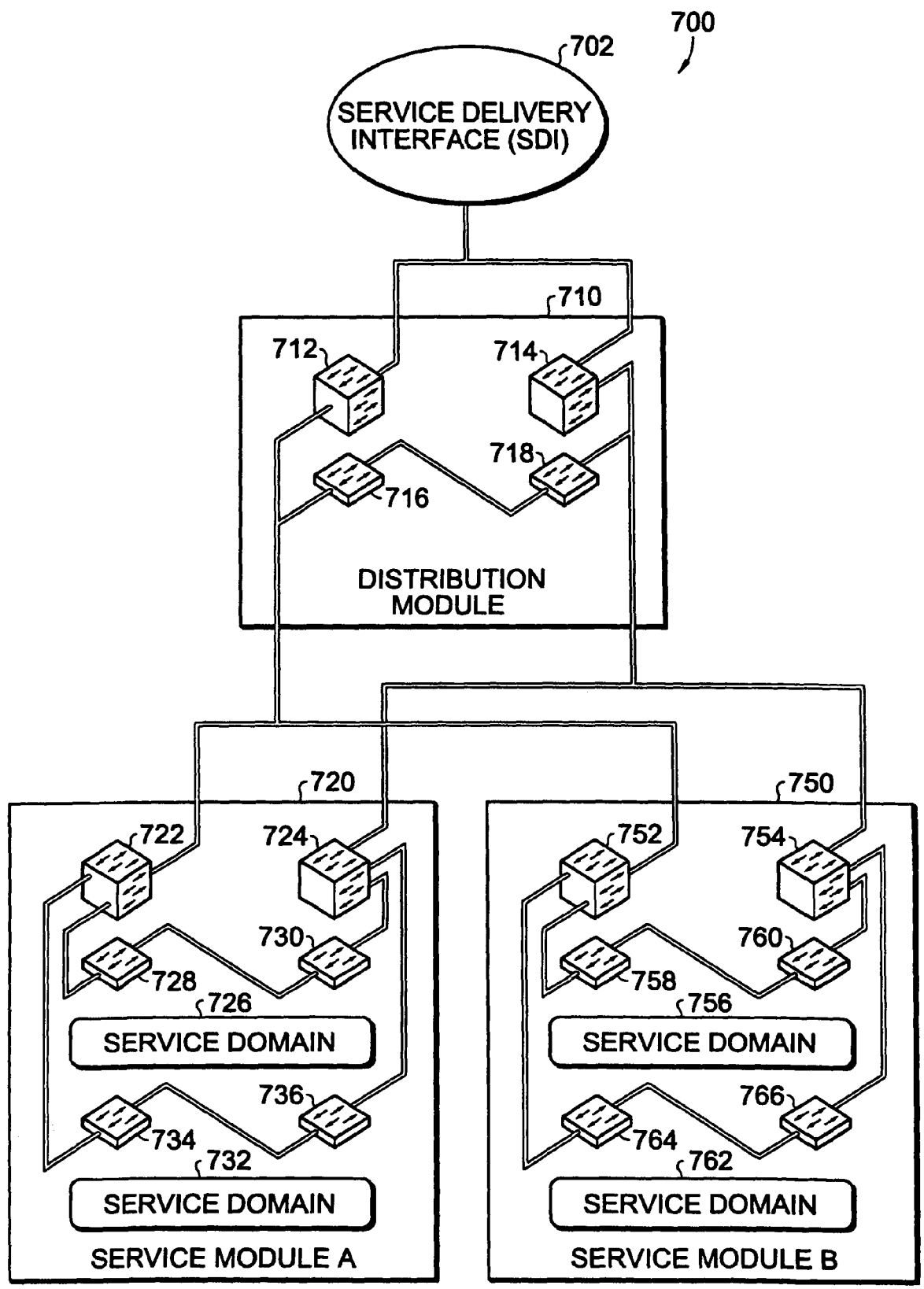
FIG. 7 illustrates a network configuration within a service delivery network in accordance with an embodiment of the present invention.

FIG. 7 depicts a network configuration within a service delivery network 700 in accordance with an embodiment of the present invention. SDN 700 includes SDI 702. Each distribution module and service module LBS within SDN 700 should have one upstream ingress/egress link. The link should have the capacity to support the requirements of the network and services. SDI 702 provides these links, as well as supports the integration layer of SDN 700. SDN 700 also includes distribution module 710 and service modules 720 and 750. Distribution module 710 includes active LBS 712 and passive LBS 714, as well as HCSs 716 and 718.

Service module 720 includes active LBS 722 and passive LBS 724. Service module 720 also includes service domains 726 and 732, that are coupled within service module 720 by HCSs 728 and 730, and HCSs 734 and 736, respectively. Service module 750 includes active LBS 752 and passive LBS 754. Service module 750 also includes service domains 756 and 762, that are coupled within service module 750 by HCSs 758 and 760, and HCSs 764 and 766, respectively.

Routing within SDN 700 may be performed by LBSs 712, 722 and 752. Routing is desired when a host, or server, attempts to communicate to another host or client off of its network segment, such as a service domain. After the router within an LBS identifies the location of a particular destination network or host, then the LBS may forward the packet appropriately. SDN 700 provides routing in service modules 720 and 750 by using the same hardware that performs the load balancing. Because each service is divided into service domains, the division provides for a highly scalable and high performing approach to service routing. The division of services also allows for additional controls to ensure certain types of packets are routed through SDN 700 into each service domain.

Inter-service domain routing in a service module may be accomplished as follows. Hosts in service domains, such as service domain 726, may be required to communicate to other hosts in service module 720, such as a supporting service. Two processes may provide inter-service domain communications. First, a service VIP may be provided through the LBSs. This approach enables the supporting service to be load balanced as well, such as with a set of DNS servers or LDAP servers. A set of service VIPs may be maintained like any other service in the LBSs, such as LBSs 722 and 724. Alternatively, a static route may be provided to the particular host IP or set of IP addresses that is automatically maintained by the LBS, such as LBS 722. If load balancing is not desired, direct communication may be supported through static routes to each network in the LBS.

Routing outside the service module, such as service module 720, may be accomplished as follows. Routing to systems or networks outside the service module also may be provided by the LBSs, such LBS 722. LBS 722, for example, may be configured with static routes or may use routing protocols such as RIP, OSPF, or BGP. This route may include access to SDI 702 and the primary integration network, such as the Internet. Many environments without BGP may use static route configurations because most internal addresses are private. This aspect allows for simple configuration of outside networks and a simple static configuration.

Service domains without service VIPs may be considered routing-only service domains. The LBS may be configured only to static route packets to these domains and may not translate or forward the packets to VIPs.

SDN 700 also supports the ability to load balance services through intelligent service routing ("ISR"). ISR is desirable for high availability of each service so that the services are able to withstand network or host outages. ISR also allows consistency of service by routing new customers to lower used hosts, or servers. ISR also allows the ability to route customers to the fastest service access point available across a geographic area or large WAN. ISR also allows security features that permit customers to connect only to service access points or service VIPs instead of the actual host.

LBSs 722 and 752 may provide several functions related to load balancing, such as translation, redirection, and health checks. Regarding translation, each LBS, such as LBS 722, publishes a service VIP for various services. The service VIP is publicly available and is routed over the network coupled to SDN 700. When a client connects to the service VIP, LBS 722 makes a decision based on the redirection and health check settings, and rewrites the packet, replacing the destination address and forwarding the packet to the desired host within its supporting service domain, such service domain 726. After the response has been made by the host, the packet is directed back to LBS 722 and the packet is rewritten again by replacing the address with the service VIP. The client should not be aware of this activity.

Redirection, or load balancing, indicates the ability for LBS 722, or other LBSs, to make various decisions based on settings and dynamic information obtained from health checks. Each LBS within SDN 700, such as LBS 722, is configured with a service VIP and with a load distribution algorithm, such as least connections or hashing. Unless session persistence or source-destination hashing is used, the client may receive a response from any host running the service. This feature may be desirable because the LBS may redirect the client to the server with the least connections. If the client is redirected to the same host every time, such as an application server holding session information, persistence should be used.

LBSs also may take into account several health factors of a host, network connection, or service. This ability varies, but it may be known to allow health checks by using pings, TCP connections, or application connections, such as HTTP. In a specified time frame, the LBS, such as LBS 722, checks to ensure availability and updates a table indicating that the host is alive and working. In addition, various vendors support customized APIs that enable customers to configure scripts and other automated settings. The requirements for this feature should be obtained from the customer, and support should be determined by the vendor documentation.

According to certain capacity values, an LBS, such as LBS 722, may be configured to send requests to a set of overflow hosts. During an extremely busy period, these hosts may forward requests to a static Web page that details the extreme load. This alternative may be preferable to allowing the client to time-out. LBSs also may provide bandwidth management features.

Scalability of services infrastructure maintains adequate service levels with a constantly growing and expanding customer base. The ability to add new services or to enhance existing services should be supported by the network architecture and not require significant changes. The scaling model for adding services according to the disclosed embodiments should be similar to server scaling. Server scaling may be discussed in terms of horizontal and vertical scaling. Adding servers offering the same service may be an example of horizontal scaling. Vertical scaling may involve adding CPUs or other hardware components within the same server. Some applications may not take advantage of additional server hardware and should be horizontally scaled. In some instances, the vertically scaled server may be out of capacity and is scaled by adding more hosts. This technique may be applied to SDN 700.

Services may be added within service domains 726, 732, 756, or 762 if the services logically meet the service domain requirements disclosed above. Additional service domains may be added to service modules 720 or 750 by adding HCSs. If additional capacity is desired by a service, the service may be split into different service domains, although the service delivery integration is shared by the entire service module. Adding service domains may be limited by specific hardware density and limitations.

If additional service domains are desired within, for example, service module 720, a service module may be added and integrated using distribution module 710. With two service modules, such service modules 720 and 750, the bandwidth support by SDI 702 may increase, even though each service module is still serviced through the bandwidth of the original connection. To use the increase bandwidth capacity of SDI 702, services should be distributed between service modules 720 and 750.

Distribution module 710 enables multiple service modules 720 and 750 to be connected and integrated to form SDN 700. Distribution module 710 may be desirable for additional services or service domain that are needed because the number of services in a service module has reached its maximum capacity. Distribution module 710 also is desired for additional bandwidth for SDI 702. Further, distribution module 710 may be desirable when content delivery network requirements use large capacity caches that should be integrated as close to SDI 702 as possible. Additional availability may be needed and addressed by distributing service modules to another location. Distribution module 710 may act as a distribution layer to transfer data and services to a separate site by using long-wave optical connections. Thus, distribution module 710 introduces an amount of flexibility by allowing customer needs, requirements, and services to change while still using the same basic service modules.

Distribution module 710 may be comprised of two LBSs 712 and 714 that provide load balancing and routing, and two HCSs 716 and 718 that provide scalable connections and allow for limited host connections, such as large high-speed content cache servers. By using HCSs 716 and 718, the ports on LBSs 712 and 714 may be used for connections to SDI 702, as opposed to limiting the number of service modules that may be supported. The HCSs within distribution module 710 may be expanded to include more service modules.

Distribution module 710 provides various capabilities for SDN 700. Some of these functions may be moved from the distribution layer and integration layer in a service module to the distribution module. Distribution module 710 provides high performance, wire-speed bridging and routing with low latency. Distribution module 710 also provides a scalable design with service module connection options. Distribution module 710 also provides network address translation capabilities without additional hardware. Distribution module 710 also provides a highly available infrastructure without a single point of failure and several methods to ensure service module network availability. Distribution module 710 also provides bandwidth management with guaranteed throughput to various services and/or clients with various quality of service capabilities. Distribution module 710 also provides content-based load balancing with delayed session binding support, a variety of health checks, and various load balancing algorithms and persistence options. Distribution module 710 also provides single service virtual LPs that are available to customers and distributed intelligently based on load and geographical data. Distribution module 710 also provides a managed network giving support for common network management platforms, with secure administration.

Distribution module also provides connectivity and routing access to service modules 720 and 750 and to SDI 702, or integration network. Routing within a service module may still be handled by the LBSs within the local service module. SDI 702, however, provides access to the primary integration network, such as the Internet. The integration network may be responsible for routing to and from SDI 702 and LBSs 712 and 714. After a packet reaches LBSs 712 and 714, LBSs 712 and 714 are responsible for routing the packet in SDN 700. This routing may be accomplished by static route table entries in LBS 712 or 714. Traffic from service modules 720 and 750 with a destination inclusive of the integration network, or its connections, also may be routed by using static routes.

Data routing between service modules 720 and 750 also may be provided by distribution module 710. The routing may be configured using static route entries because they do not require dynamic updates and are constantly available. Additional routes should not be needed to support additional hosts but may be desired to support additional service domains.

The load balancing functions at distribution module 710 should be identical to those within service modules 720 and 750. Because of the hierarchical arrangement, some functions may be distributed to the distribution module layer that offloads some of the traffic at each service module. The arrangement also allows for additional content load balancing to occur above service module 720 and 750 and redirection to edge services, such as cache servers. The cache servers may cache content located anywhere within any service module or even the integrated network. The arrangement may serve to limit the amount of traffic routing through each service module.

Distribution module 710 also may provide a monitoring function for service modules 720 and 750 of SDN 700. A very high availability environment may include the same service being in separate service modules. Distribution module 710 may perform health checks on each service. This feature may allow a site to take down one service domain having the service for maintenance, and keep the other service domain running.

Figure 8:
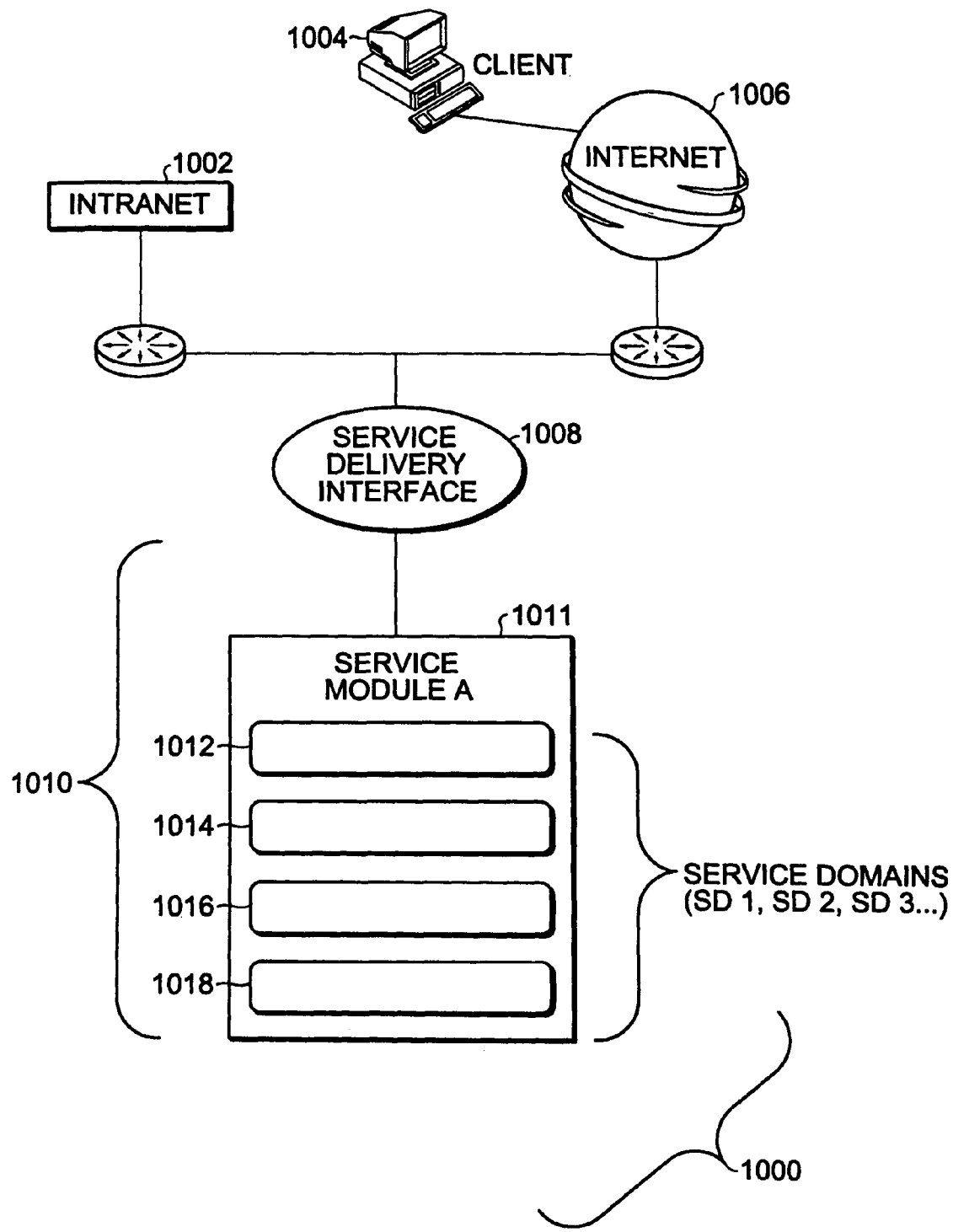
FIG. 8 illustrates an example of a service delivery network within a corporate intranet.
Figure 9:
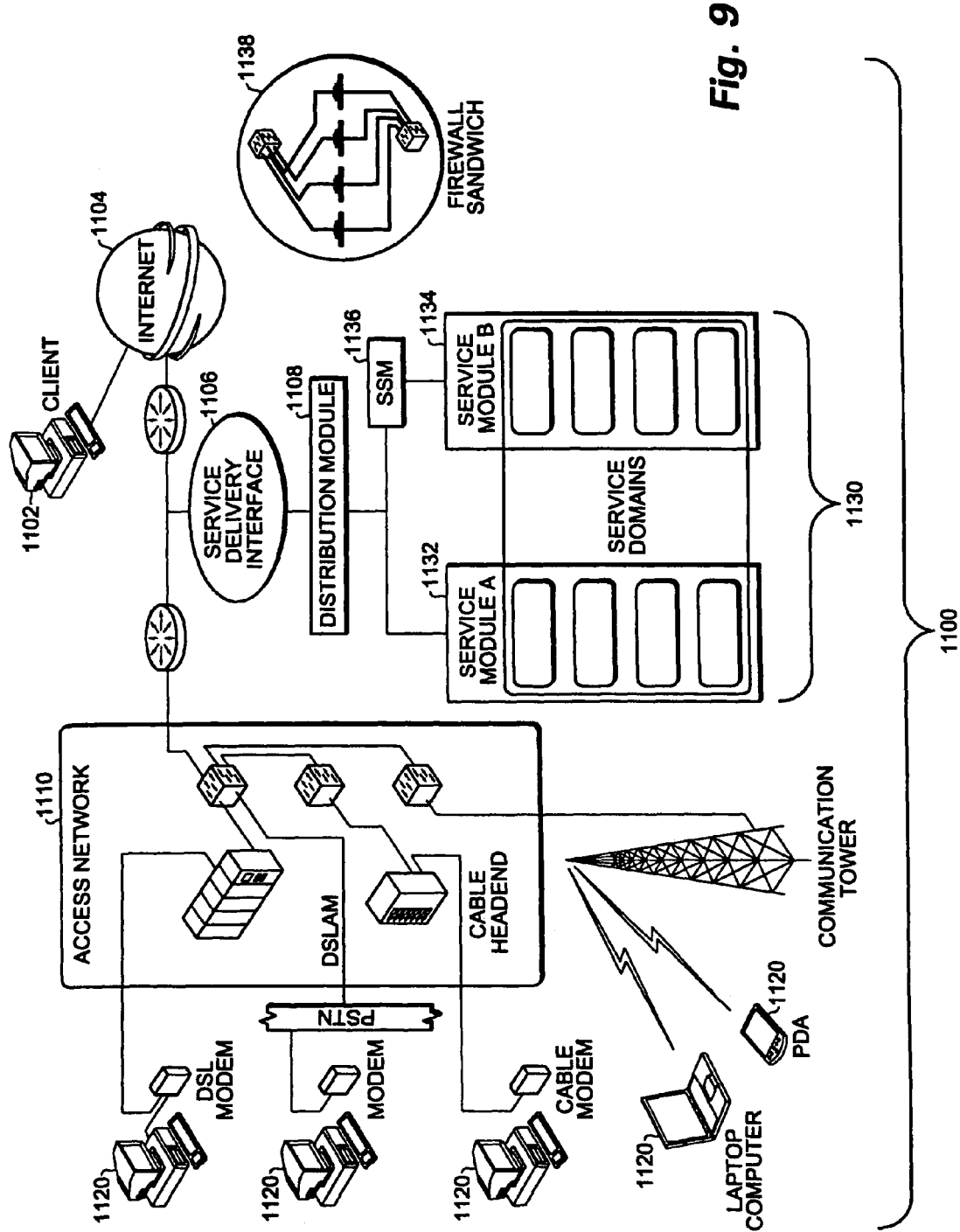
FIG. 9 illustrates an example of a service delivery network within an Internet service provider.
Figure 10:
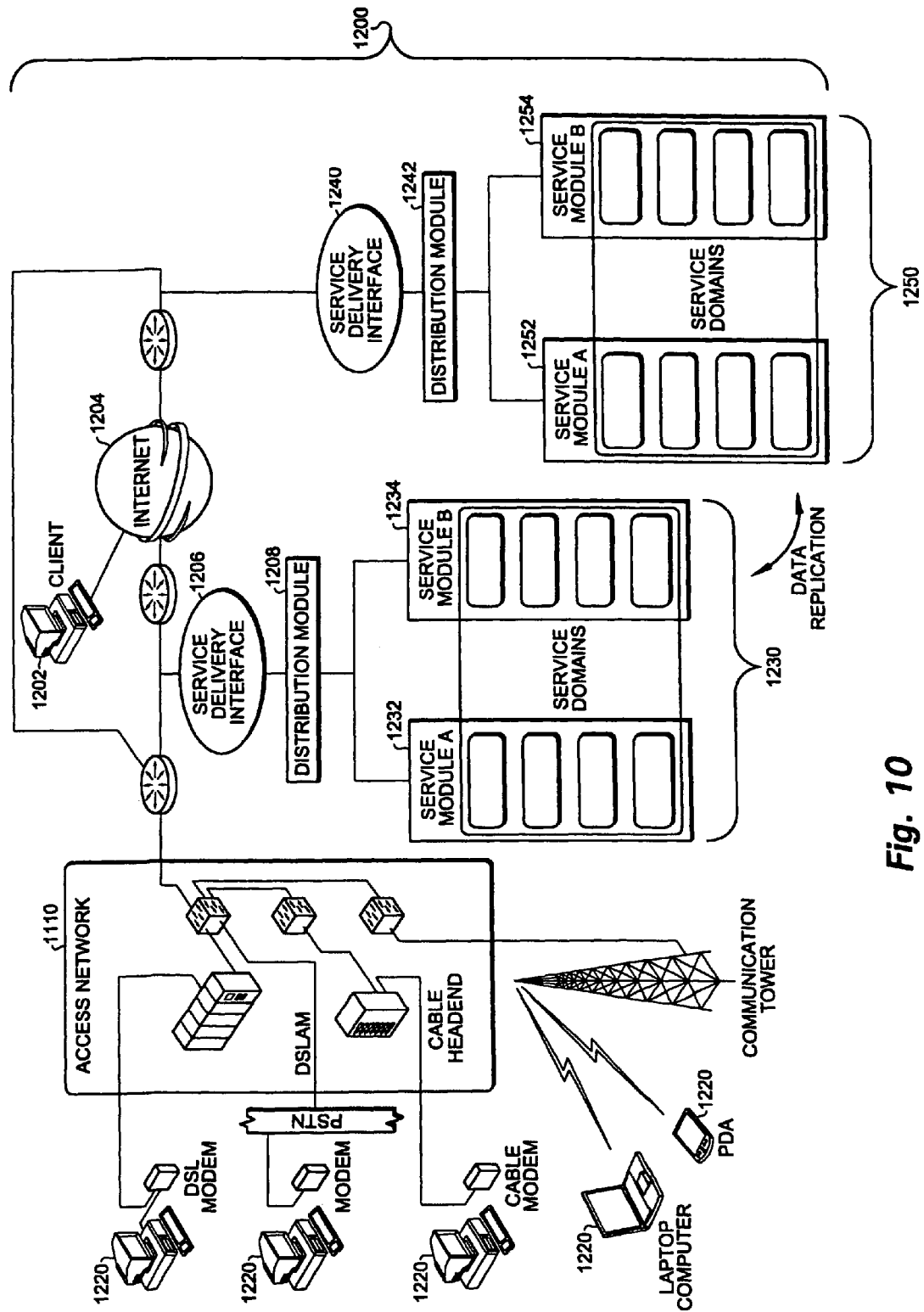
FIG. 10 illustrates an example of service delivery networks within an Internet service provider.

FIGS. 8-10 depict implementation examples of a service delivery network. These examples illustrate the flexibility and scalability of the disclosed embodiments. The present invention, however, is not limited to these examples, or the subject matter disclosed with reference to the examples. For example, implementation of a service delivery network also may include management or backup networks.

FIG. 8 depicts an example of a service delivery network 1010 within a corporate intranet 1002. In this example, a corporate information technology department has chosen to use SDN 1010 to deploy several internal services. Network 1000 also includes external networking to client 1004 via Internet 1006. Thus, intranet 1002 should integrate some external systems, such as email, in addition to internal systems. Service delivery interface 1008 includes access to Internet 1006 for emails and the corporate wide area network.

SDN 1010 may include service module 1011 that provides services as needed to intranet 1002. Service module 1011 may comprise service domains 1012, 1014, 1016, and 1018 that support different services. For example, service domain 1012 may support Web services that provide internal Web pages. Service domain 1014 may support human resources application services from a human resources database. Service domain 1016 may support human resources database services, and corresponds to service domain 1014. Service domain 1018 may support front-end email services for intranet 1002. Additional service domains may support email multiplexor services and message store services. Service domains may be added to service module 1011 as additional services are desired over intranet 1002 or network 1000.

Thus, for example, if Web services are desired by a user on intranet 1002, then service domain 1012 is accessed. The access request is received at SDN 1011 after service delivery interface 1008 serves as an integration point for the service requests. Servers within service domain 1012 are engaged to provide the service and to execute any applications to support the Web services. Thus, servers in the other service domains are not engaged. Further, if Web services are desired to be removed from intranet 1002 or network 1000, then service domain 1012 may be removed from service module 1011 without severely impacting the other services provided by SDN 1011.

FIG. 9 depicts an example of a service delivery network within an Internet service provider ("ISP") 1100. ISP 1100 may be a medium-size ISP implementing core ISP services. ISP 1100 allows users 1120 to post Web pages to an external Web hosting service and also provides network access for dial-up, broadband, and wireless users 1120. Users 1120 may use desktops, laptops, PDAs, and the like to couple with access network 1110 to receive information and services over Internet 1104. Users 1120 also may use modems, digital subscriber line modems, cable modems, communication towers, and the like to link to access network 1110.

As service requests are generated by users 1120, service delivery interface 1106 receives those requests intended for SDN 1130 and integrates the requests. Distribution module 1108 is coupled to the service modules within SDN 1130 and enables the service modules to communicate and work together. Distribution module 1108 also aggregates services to service delivery interface 1106.

SDN 1130 may include service modules 1132 and 1134. Service modules 1132 and 1134 may provide distinct services to ISP 1100. Service modules 1132 and 1134 are comprised of service domains that support the provided services with host servers. The service domains may correlate to other service domains supported on a different service module. For example, service module 1132 may support service domains that provide access services, email services, and directory services. Each one of these services may be broken into sub-services, such as front-end email services and message store services for email services. A service domain may support each sub-service such that service module 1132 has several service domains. Service module 1134 also may support services over several service domains, such as corporate Web services, database services, and domain name services. These services also may be broken into sub-services on different service domains. The service domains, as disclosed above, may communicate to each other and to other service modules via switches within the service modules and SDN 1130.

Network 1100 also may be a multi-customer hosting provider that provides network access for many different customers. SDN 1130 may have flexibility in meeting security requirements and the ability to scale each customer individually. A service module may be provided for each customer such that the service module may configured to the customer's requirements. For example, one customer may desire a service module with heightened security. Thus, service security module 1136 is provided for service module 1134, while service module 1132 may use the integrated security provided by SDN 1130. Service security module 1136 may comprise firewall sandwich 1138. The customer accessing service module 1134 may have sensitive data or applications on the servers within the service domains of service module 1134.

Thus, a user within users 1120 may request a service provided by network 1100. The service may be supported by a service domain on service module 1132 of SDN 1130. The service domain is accessed after the request has been integrated by service delivery interface 1106 and routed to service module 1132 by distribution module 1108. The servers within the service domain execute the applications to deliver the service to the user. For example, if the user desires web services, a service domain supporting Web services is engaged to deliver the Web services over network 1100. If the user desires secure information, such as billing information, distribution module 1108 may route the service request to service module 1134, with security measures enabled by service security module 1136.

FIG. 10 depicts an example of service delivery networks 1230 and 1250 within an Internet service provider ("ISP") 1200. This example expands on the example disclosed above. ISP 1200 includes a multi-site ISP that has customer data at two locations, SDN 1230 and SDN 1250. Dynamic global server load balancing may be used at each site to ensure proper client redirection. Customer data may be replicated at SDNs 1230 and 1250 using a back-end integration network.

Users 1220 may use desktops, laptops, PDAs, and the like to couple with access network 1210 to receive information and services over Internet 1204. Users 1220 also may use modems, digital subscriber line modems, cable modems, communication towers, and the like to link to access network 1210.

As service requests are generated by users 1220, service delivery interface 1206 receives those requests intended for SDN 1230 and integrates the requests. Distribution module 1208 is coupled to the service modules within SDN 1230 and enables the service modules to communicate and work together. Distribution module 1208 also aggregates services to service delivery interface 1206.

SDN 1230 may include service modules 1232 and 1234. Service modules 1232 and 1234 may provide distinct services to ISP 1200. Service modules 1232 and 1234 are comprised of service domains that support the provided services with servers. The service domains may correlate to other service domains supported on a different service module. For example, service module 1232 may support service domains that provide access services, email services, and directory services. Each one of these services may be broken into sub-services, such as front-end email services and message store services for email services. A service domain may support each sub-service such that service module 1232 has several service domains. Service module 1234 also may support services over several service domains, such as corporate Web services, database services, and domain name services. These services also may be broken into sub-services on different service domains. The service domains, as disclosed above, may communicate to each other and to other service modules via switches with the service modules and SDN 1230.

Further, ISP 1200 includes SDN 1250. SDN 1250 includes service modules 1252 and 1254. Moreover, service delivery interface 1240 and distribution module 1242 correlate to service delivery interface 1206 and distribution module 1208 in that service requests are received, integrated and distributed to the proper service domains in service module 1252 or 1254. SDN 1250 may replicate the service domains within SDN 1230. Thus, customers, or users 1220, may access either SDN 1230 or SDN 1250 to receive the desired service. Alternatively, both SDN 1230 and SDN 1250 may be accessed to deliver the services requested. Thus, if a customer requests billing and accounting services and information, then a service domain within SDN 1230 may be engaged or a service domain within SDN 1250 may be engaged. Decisions on which SDN to access to deliver the service may be based upon availability, location of the SDN to the customer, security measures, paths of least latency, and the like. Further, the accessed SDN may be assigned randomly to deliver the requested service.

Figure 11:
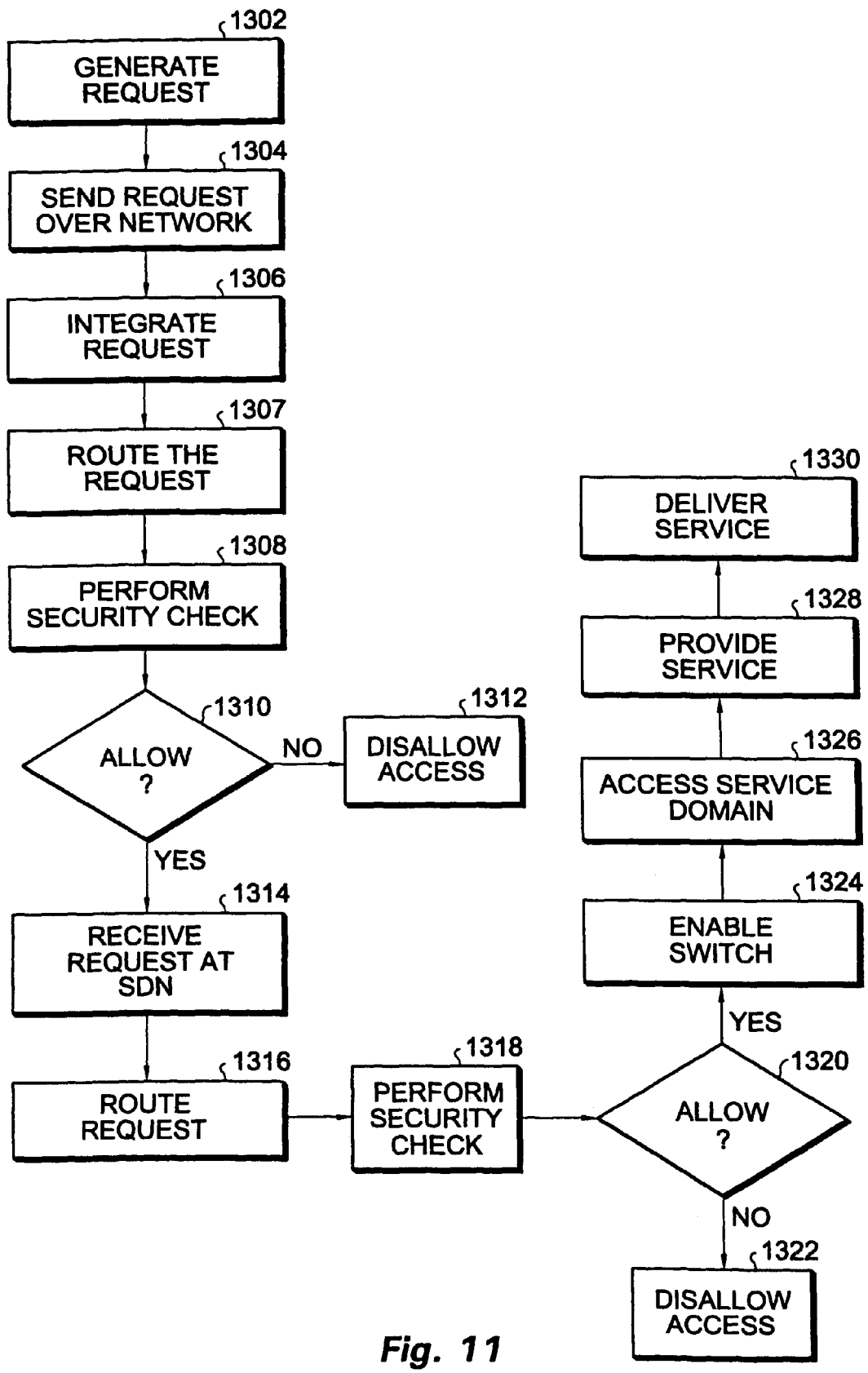
FIG. 11 illustrates a flowchart for providing a service over a network in accordance with an embodiment of the present invention.

FIG. 11 depicts a flowchart for providing a service over a network in accordance with an embodiment of the present invention. The network may be capable of providing, supporting and delivering a multitude of services to a variety of user on different platforms. Step 1302 executes by generating a request for a service. The request may be generated from a user linked to the network. The user may be linked by a communication medium, such as the Internet. Step 1304 executes by sending the request over the network to the applicable service provider. The user may be linked to the network by an access network.

Step 1306 executes by integrating the request at a service delivery interface coupled to a service delivery network. The service delivery network should be able to provide and support the service requested by the user. Step 1307 executes by routing the request to a service module. A distribution module may route the request, if present. Step 1308 executes by performing a security check on the request and its corresponding information before delivering the request to the service delivery network. An integration security module may be used to provide the security check. Step 1310 executes by determining whether the request should be allowed to the service delivery network. If no, then step 1312 executes by disallowing the request. An appropriate message may be sent noting that access to the service has been disallowed. If step 1310 is yes, then step 1314 executes by receiving the request at the service delivery network.

Step 1316 executes by routing the request to the appropriate service module. The request may be routed by a distribution module within the service delivery network, especially if there is more than one service module. Otherwise, the request may be routed by the service delivery interface. Step 1318 executes by performing a security check within the service delivery network. The security check may be performed by a service security module. Step 1320 executes by determining whether to allow the service to be accessed within the service module. If no, then step 1322 executes by disallowing access to the service module. This step may not mean that access is denied to other service modules within the service delivery network.

If step 1320 is yes, then step 1324 executes by enabling a switch within the service module to route the request to the appropriate service domain. The switch facilitates communication between the service module, service domain, and the network. Step 1326 executes by accessing the service domain that supports and provides the service requested by the user. Service domain may include servers that host the data and applications to provide the requested service. The applications may be executed and the data used to support the service over the network. Step 1328 executes by providing the service through connections to the network and running the servers within the service domain. Step 1330 executes by delivering the service over the network via the communication medium to the user. Additional requests and information exchange may occur as disclosed above. In an alternative embodiment, no security checks may be performed on the information exchanged from the network and the service delivery network or service module.

Thus, the disclosed embodiments provide advantages and improvements over known network systems. The nature of the Internet economy is dynamic. Thus, network infrastructure should change in terms of size and functionality. By incorporating a modularized architecture as disclosed above, new functions may be integrated by conceptualizing the functions as modules and mapping from conceptual modules to physical modules that comprise hardware and software components at varying levels of abstraction. The disclosed embodiments allow the system architecture to be loosely coupled so that addition and removal of services and components may occur without major integration efforts. Further, the structure may be changed as applications change.

As can now be appreciated, the use of the SDN concept allows separation of services based on their business and technical function. For example, separate service domains can be provided within an SDN for a database and for a web server. This provides both scalability and security, as the SDN can be designed and operated to "dial-in" specific services over the network and disable all others, which enables a distributed security model (i.e., a defense in depth model) that can implement reinforcing security mechanisms based on user or operator defined acceptable levels of risk.

With reference to FIGS. 12-16, another aspect of the invention will now be described that is provided to support dynamic provisioning and virtualization of services and service domains. According to this aspect of the invention, logical service domains (LSDs) are introduced or added to the SDN concepts and models described with reference to FIGS. 1-11. LSDs are configured to implement many of the service domain ideas discussed earlier but are implemented much differently with a logical construct that breaks physical barriers or restraints that may be associated with "standard" service domains. With the standard domains shown in FIGS. 1-11, it was difficult for one host to span more than one service domain or to provide more than one service and re-cabling may be required to span another service domain (e.g., a host in a standard service is typically physically cabled to an HCS).

A key feature of the LSDs of the invention is the use of resource encapsulation with logical constructs, such as a container technology (see, for example, Solaris Operating Environment Containers or similar technologies that allow encapsulation of applications all running on the same operating system (OS) instance). With the use of resource encapsulation, logical service domains or LSDs can be used to enable a SDN to be configured with many hosts to many servers as the model based on the container or resource encapsulation rather than on a particular component or a physical box. As a result, one host can belong to or move between multiple service domains and each server device or box can provide more than one service. In some preferred embodiments, very mobile services are provided by tying the use of VLAN tagging to the logical construct of containers rather than to a physical port or device. Further, provisioning technologies, such as the N1 Grid Service Provisioning System available from Sun Microsystems, Inc., may be implemented within an LSD-based SDN to automate the addition and distribution of services based on demand, user requests, and other factors. Hence, while standard service domains provide potentially higher levels of security, the use of logical service domains within an SDN provides significant cost savings (e.g., less maintenance and operating costs) along with enhanced strategic flexibility. Business issues are becoming the drivers of network configuration and operation and are pushing for reduced physical plant costs, reduced re-cabling, and the ability to dynamically provision services.

Logical service domains allow customers to better utilize network resources in conjunction with system resources. LSDs use the capabilities of a SDN with standard service domains but significantly extends its features to support VLAN tagging by one or more hosts. Further, since SDNs are so flexible, embodiments of the invention (not shown) may incorporate both the standard service domains and LSDs and provide for multiple switching or HCS options. For example, an SDN may include dedicated switches where each switch services a dedicated network in which hosts are physically cabled to each dedicated switch. In such an SDN, manual re-provisioning would be required when changes were required in the network connections and a dedicated interface for each network or service domain would typically be provided. In another exemplary SDN, port-based VLANs may be provided on shared switches. In this example, switches use port-based VLANs to assign network identity to each physical port on the switch, which can be manipulated by a human operator or a provisioning server. This example SDN would use a dedicated interface for each network or service domain but does allow the network identity to be changed by the switch.

In contrast, LSD-based embodiments of SDNs provide VLAN tagging on shared switches. In these embodiments, hosts connected to the network can dynamically determine which VLAN to direct packets. This allows the host to belong to several physical networks, but ties each packet back to a logical service domain or VLAN associated with such a logical service domain. Services can be separated while still enforcing at least some security features of the standard domain service-based SDN. Further in this example, each physical interface preferably can communicate on multiple service domains or networks based on ACLs enforced by the switch. Highly secure resources such as certain database servers may still utilize port-based VLANs in hybrid or combined SDNs that use LSDs concurrently with standard service domains.

Figure 12:
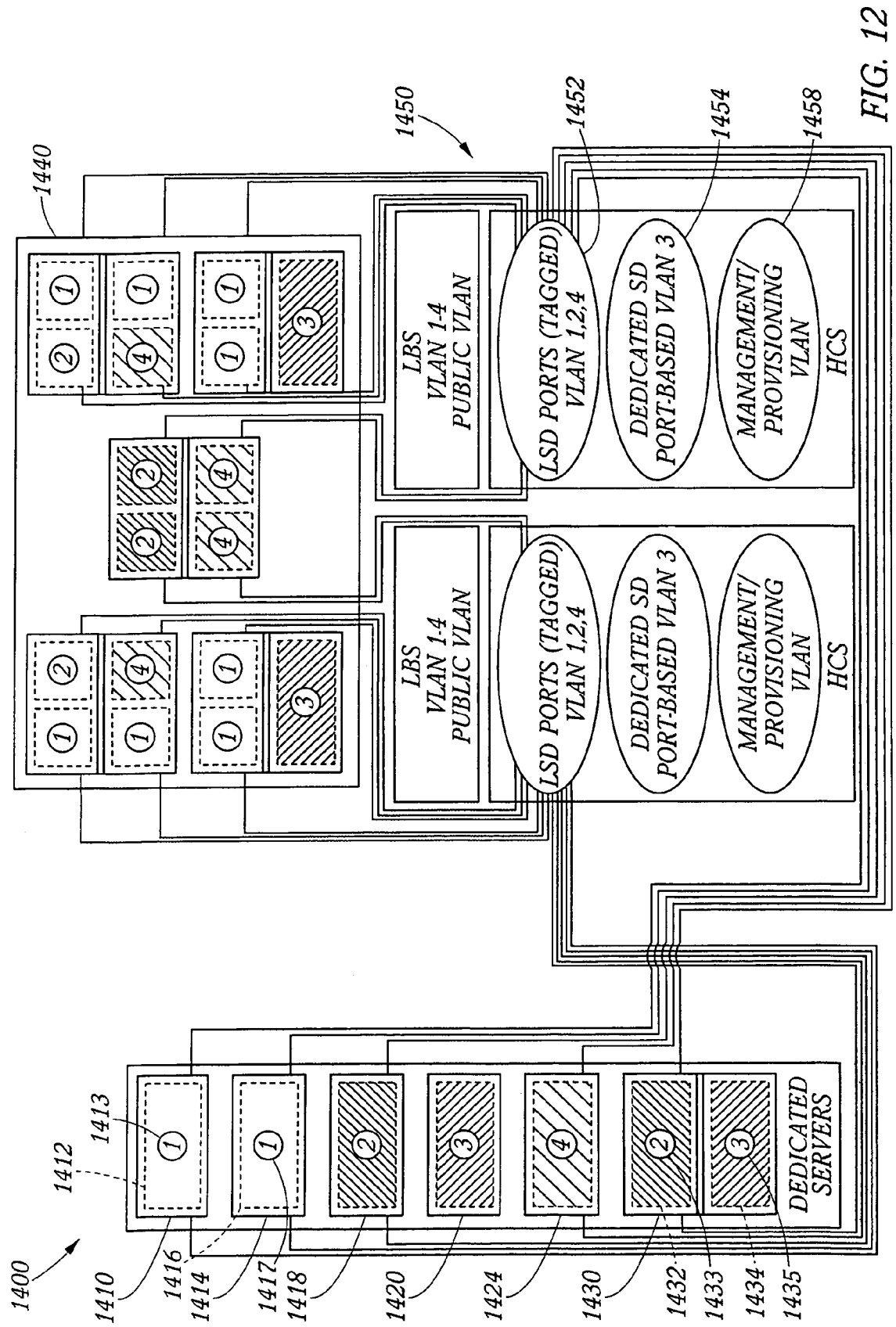
FIG. 12 illustrates a service delivery network configured with logical service domains according to one embodiment of the invention.

With this general understanding of the LSD, it may now be useful to describe with reference to FIGS. 12-16 several exemplary embodiments of service delivery networks that incorporate the concept of a logical service domain and resource encapsulation through containers. FIG. 12 illustrates a service delivery network (SDN) 1400 that incorporates logical service domains (LSDs). The SDN 1400 includes a number of dedicated servers 1410, 1414, 1418, 1420, 1424, 1430 and servers arranged in a cluster 1440. These servers may be a mixture of low-end servers, such as blades or the like, and high-end servers capable of supporting multiple LSDs, such as server 1430. Differing security zones in which varying levels of security measures are implemented can be provided in the SDN 1400 and this is represented with the use of hashing within each encapsulated resource or container, i.e., security zones 1-4 labeled SZ1, SZ2, SZ3, and SZ4.

As shown, resources are encapsulated within each physical server through the use of containers, e.g., containers 1412, 1416, 1432, 1434 (with only a few containers being labeled for simplicity but being shown in each server including servers in cluster 1440). In these containers, resources used for providing a service are encapsulated and in this case, include applications 1413, 1417, 1433, 1435. As shown, the applications are numbered 1-4 to illustrate the use of four applications to provide four services within four logical service domains in four different security zones. As shown, the services 1-4 and their corresponding LSDs are distributed in the SDN over a plurality of physical servers, such as servers 1410, 1414, 1416, 1418, 1420, 1424, and 1430. While a single container, LSD, and application may be provided on a single server or computing device, a shared frame 1430 may include two or more LSDs and hence, two (or more) containers 1432, 1434 that encapsulate two resources, such as resources 1433, 1435 associated with service applications 2 and 3. Note, two security zones are implemented in this case within the shared frame 1430.

As shown, the SDN 1400 includes a switch system 1450 comprising one or more LBS and one or more HCS that function as described with reference to FIGS. 1-11 with the utilization of VLAN tagging. In this regard, the HCS's are shown to include tagged LSD ports 1452 for VLANs 1, 2, and 4, dedicated SD 1454 for port-based VLAN 3, and a management/provisioning VLAN 1458.

In general, a VLAN is a virtual local access network in which a subgroup of network computers act as though they are connected together in a single LAN. In fact, however, the computers are on different segments of the physical LAN or other network. VLANs connect their computers via software, not hardware, to increase flexibility and in the present application, enable the creation of LSDs in SDN 1400. Static, port-based VLANs used for standard service domains can be used to segment a network without using routing but can only be implemented on a single switch or switches cabled together. In contrast, the SDN 1400 uses VLAN tagging, such as that described by the 802.1Q IEEE standard, to share VLAN information across switches. Typically, each switch in the SDN 1400 is able to use and recognize a tag header (and this ability is sometimes called "VLAN tagging"). Switches that implement tagging, such as 802.1Q tagging, add the tag header to the frame directly after the destination and source MAC addresses. Briefly, the tag header indicates that the packet has a tag (i.e., an Ethertype), whether the packet should have priority over other packets, and which VLAN the packet belongs to so that the switch can forward or filter it correctly. Frame tagging in this manner assigns a user-defined ID (i.e., a VLAN-ID) to each frame, and it also enables a switch to communicate VLAN membership information across multiple network devices by frame tagging. As a result, the switches can transfer packets associated with logical service domains associated with a VLAN across multiple network devices without the need for re-cabling or other hardware modifications to a network such as SDN 1400. During the operation of SDN 1400, packets are identified as tagged and an identification of which LSD or WAN that the packet belongs is provided, and switches use this information to transfer the packets across the switches (when necessary) to facilitate provisioning of highly mobile services.

Referring again to FIG. 12, the SDN 1400 can be considered a hybrid or combination service delivery network because it includes at least one service domain that is port-based. VLAN 3 is dedicated in SDN 1400 to supporting application 3, and such an implementation may be used to provide a security zone with higher security measures such as for a database server. This demonstrates how a mixture of port-based VLANs and VLAN tagging can be used within a single SDN 1400 to provide standard service domains and LSDs. Each physical domain only has a pair of production interfaces 1452, 1454 that are either dedicated to a specific VLAN, such as VLAN 3, or are shared through tagging, such as by VLANs 1, 2, and 4.

In SDN 1400, each host has dual connections to the production VLANs 1452, 1454 that are typically provided via backup interfaces with, for example, IPMP. Both HCSs in the switch system 1450 are actively bridging traffic to servers and the LBSs. LBS connections are provided in SDN 1400 but are not shown to the HCSs to reduce the complexity of FIG. 12. The separate management and provisioning interface 1458 is provided, in part, to allow an out of band interface for these operations. The provisioning VLAN would be active on an interface during provisioning activities, such as those provided during a server load process by an N1 or other provisioning server (not shown).

As will be appreciated, the SDN 1400 enables resource sharing and installs any number of applications on an OS instance. This design reduces the number of interfaces needed for each server and allows soft re-cabling of the infrastructure of SDN 1400. The SDN 1400 still supports the standard SDN model (such as with port-based service domains) but also allows easy integration of new and expanding services through the use of LSDs.

Figure 13:
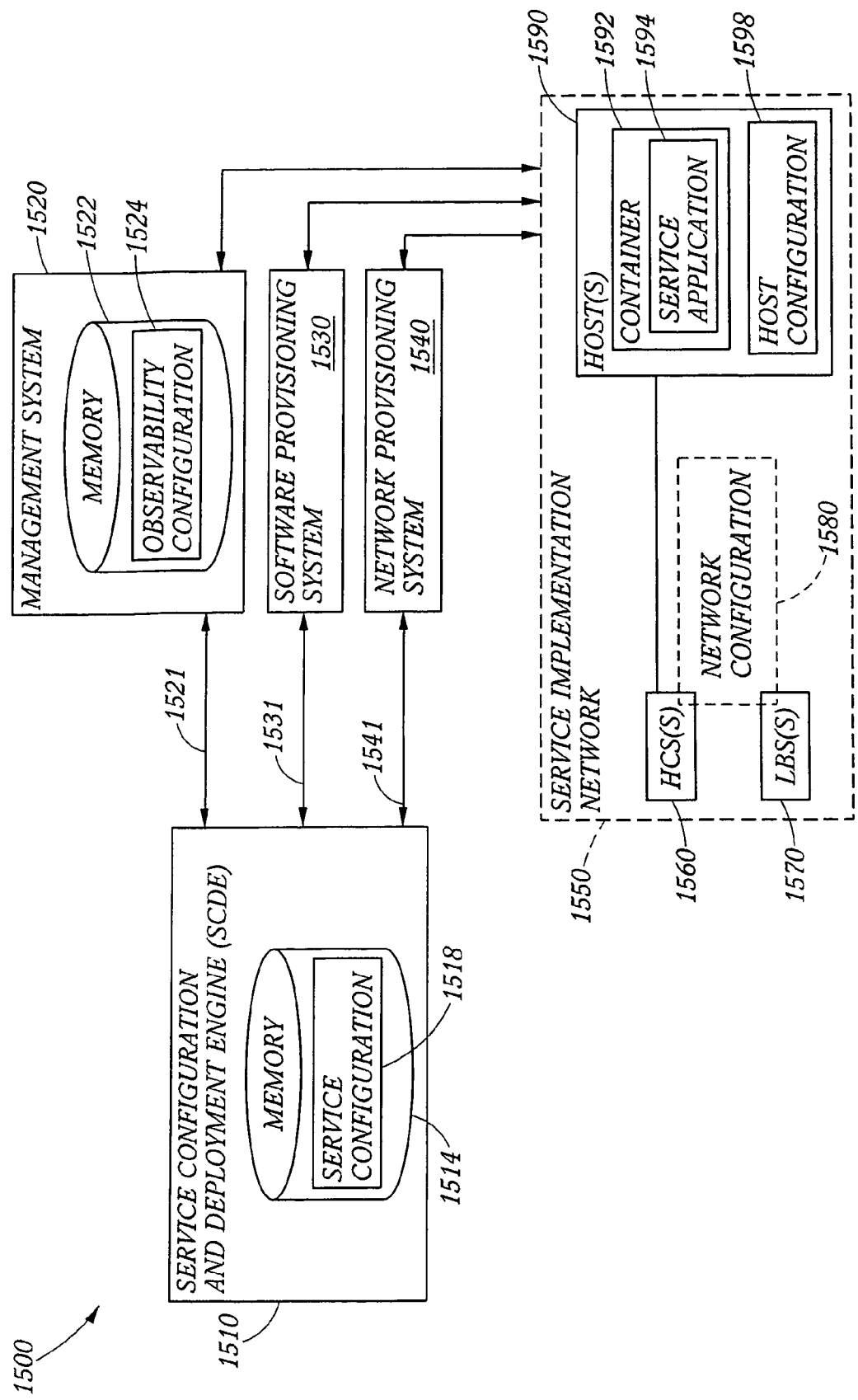
FIG. 13 is a block diagram showing another service delivery network adapted with logical service domains to support automated network provisioning of services.

FIG. 13 illustrates another embodiment of a service delivery network (SDN) 1500 according to the present invention, which may be incorporated within the SDN 1400 of FIG. 12 or provided in another SDN or used separately. The SDN 1500 includes a service configuration and deployment engine (SCDE) 1510 with memory 1514 (or access to data storage) storing service configuration information 1518. In a typical SDN, system component and configuration information is distributed and not contained within a single system. The SDN 1500 includes the SCDE 1510 to act as a coordinator by storing the service configuration 1518 and by taking service configuration commands and information and performing various commands to other systems within the environment of SDN 1500. As shown, the SCDE 1510 interfaces with a management system 1520, a software provisioning system 1530, and a network provisioning system 1540 via connections/interfaces 1521, 1531, 1541. The management system 1520 includes memory 1522 storing the observability configuration 1524.

The SCDE 1510 and components 1520, 1530, and 1540 combine their functions to manage configuring the SDN 1500 to provide services. However, the following discussion stresses network provisioning to dynamically provide mobile services in a distributed computing network such as SDN 1500. The SDN 1500 further includes a service implementation network 1550 (such as the networks described in detail in FIG. 12) that is linked via connections/interfaces to the management system 1520, the software provisioning system 1530, and the network provisioning system 1540. The service implementation network 1550 includes one or more HCS 1560 and one or more LBS 1570 having a network configuration 1580. One or more host 1590 is linked to the HCS(s)

1560. As discussed with reference to FIG. 12, the use of LSDs includes the encapsulation of resources, and in this regard, the host 1590 includes a service application 1594 encapsulated in a container 1592. Further the host 1590 includes/stores the host configuration 1598.

Figure 14:
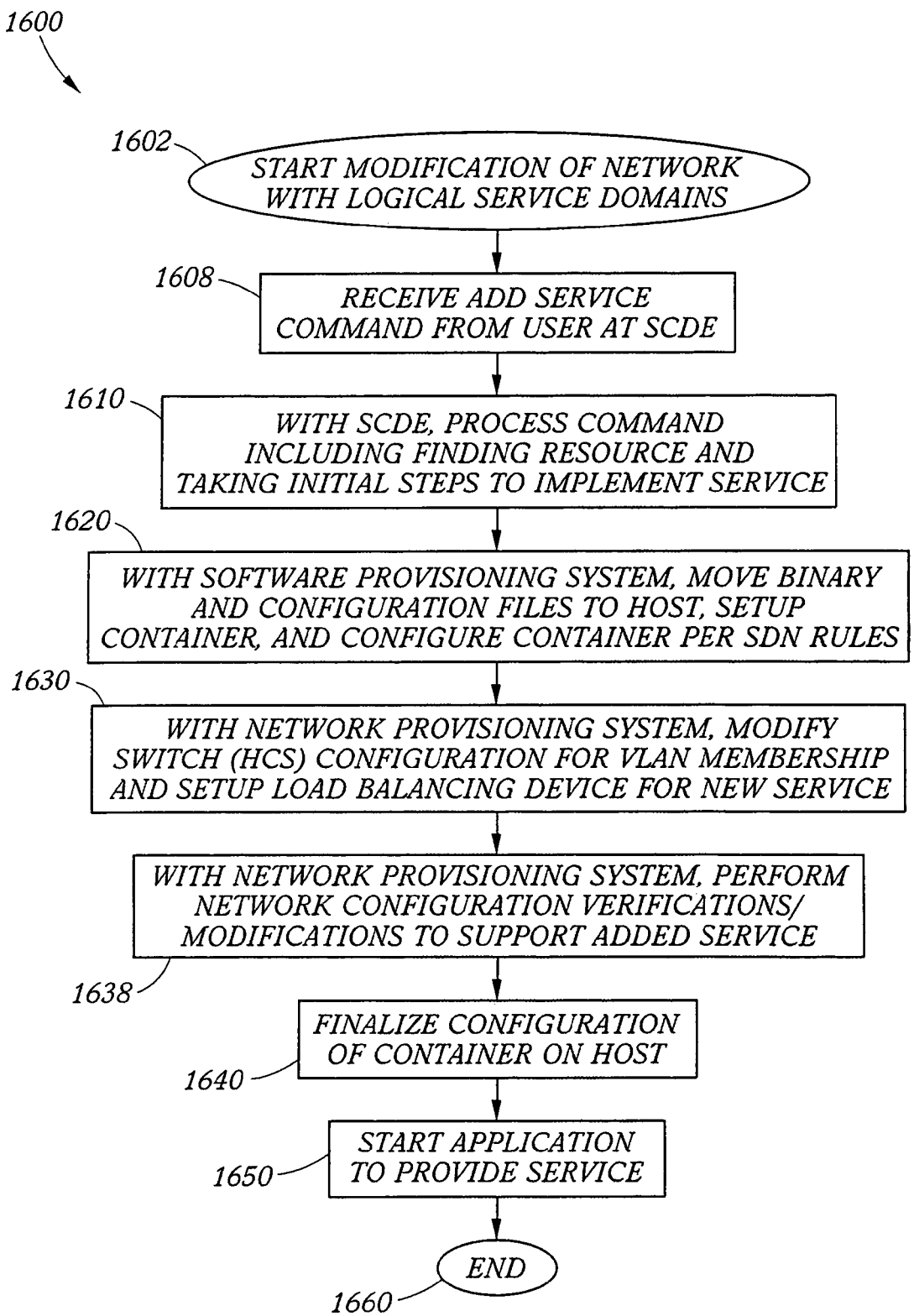
FIG. 14 is a flow chart for a method of modifying a network, such as a service delivery network, and/or its services through the use of logical service domains, such as through the operation of components in the network of FIG. 13.

The SCDE 1510 is adapted for adding, modifying, and removing services, servers or other devices, software, and other components of the SDN 1500. As an example of such functions, FIG. 14 illustrates operation 1600 of the SDN 1500 to add a new service to SDN 1500. Similar processes would be performed to modify or delete a service or add, delete, or modify a network component. As shown, the service addition process 1600 begins at 1602 such as by providing or running the SCDE within the SDN 1500 and/or collecting the service configuration 1518.

At 1608, a user enters a command to add a service to the SDN 1500, and this command is received by the SCDE 1510. For example, a user may request that a service represented by an application with various configuration parameters be added to the SDN 1500. Preferably, in the SDN 1500, service applications are deployed as containers to a server/host platform. At 1610, the SCDE 1510 processes the received command. The SCDE 1510 identifies and locates resources required to run the application or useful for implementing the application or service in the SDN 1500. The SCDE 1510 then executes processes to facilitate the new service such as for example, taking configuration information 1518 (e.g., plans, components, and the like useful for provisioning such as N1 Grid SPS) and configuring the management system 1520 for telemetry and/or other managing functions.

Next, the "actual" provisioning systems to operate in response to initiation signals or commands from the SCDE 1510 to continue adding the new service. At 1620, the software provisioning system 1530 acts to move various binary and configuration files to the host server 1590. The software provisioning system 1530 then sets up the container 1592 and configures the container networking VIPs and interfaces according to SDN rules described earlier with reference to FIGS. 1-13. At 1630, the network provisioning system 1540 acts to modify the switch or HCS 1560 by changing (if necessary) the configuration 1580 to provide proper VLAN membership for the container 1592 and contained service application 1594. This may involve checking dependencies to avoid breaking another existing container. The network provisioning system 1540 further acts to configure the LBS 1570 for the new service including adding or setting VIP, real server IP, LB rules, and access control lists (ACLs) per SDN rules or features described earlier.

At 1638, the network provisioning system 1540 further acts to perform network configuration 1580 verifications and/or modifications to support the added service. This step 1638 may include making changes to the HCS 1560 and/or LBS 1570 including: add/change VLAN/port configuration on HCS 1560; add/change LBS real server configuration; add/change LBS virtual server configuration; add/change LBS ACL configuration; and add/change LBS load balancer rules. At 1640, the configuration of the container 1592 on the host is finalized such as by modifying or providing host configuration 1598. For example, the container 1592 may be configured using Solaris/N1 Grid-type containers. Step 1640 may include installing and configuring applications 1594, configuring network connections (such as ifconfig for Solaris), assigning virtual interfaces for the host 1590 (such as via ifconfig), and configuring, if necessary, multi-pathing. Container configuration during 1620 and/or 1640 may include resource encapsulation configuration with a resource manager and potentially establishing or setting security zones in the SDN 1500. At 1650, the application 1594 is started to provide the new service, and the method 1600 ends at 1660.

Figure 15:
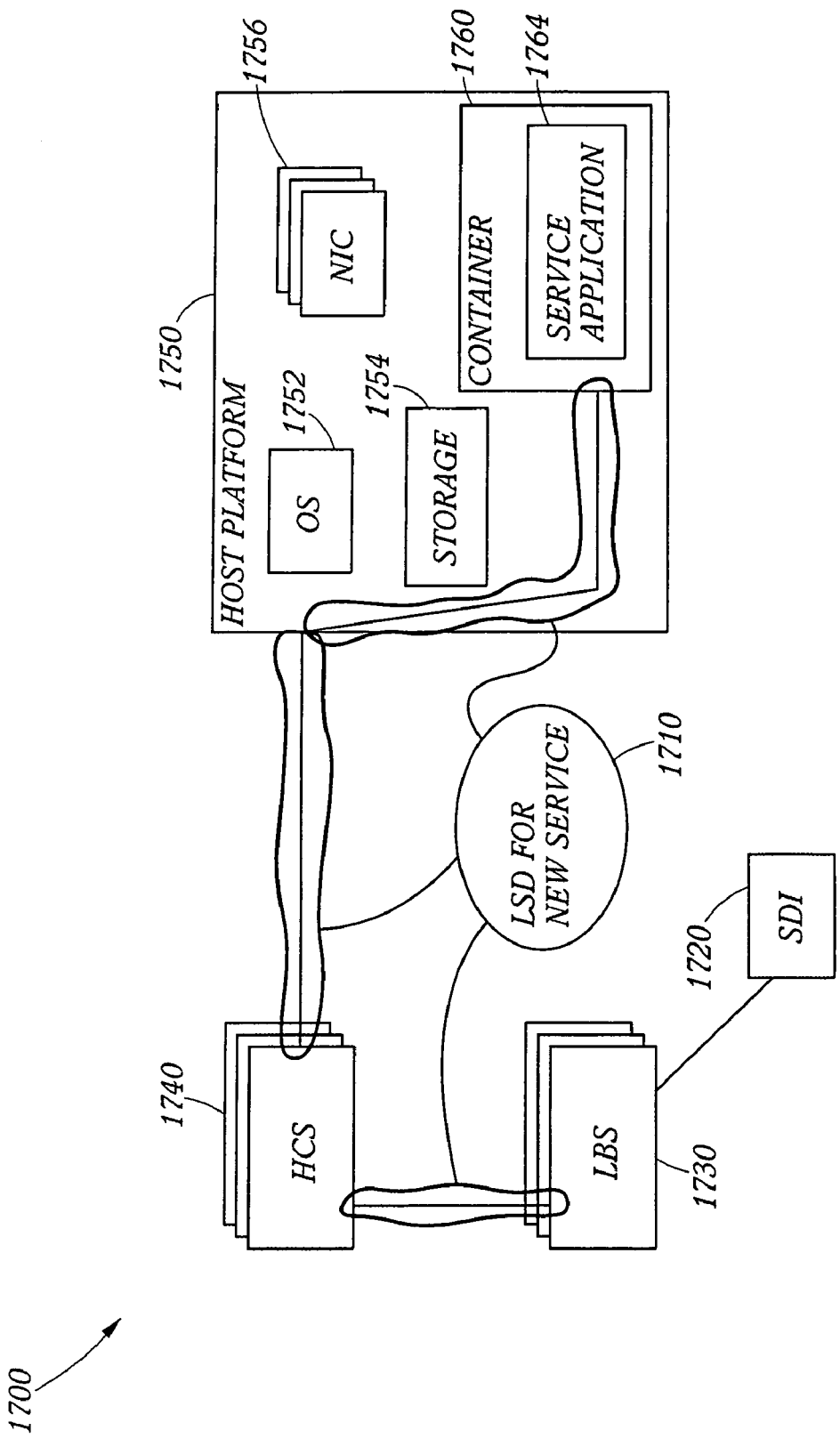
FIG. 15 provides a more detailed view of a portion of a service delivery network with logical service domains (LSDs) after it has been modified to add a new service (and a new corresponding logical service domain for that new service, if necessary, or modification of an existing LSD).

FIG. 15 shows in more detail portions of a SDN 1700 such as similar portions of SDNs 1400 and 1500. As shown, the SDN 1700 includes an LSD 1710 for a new service, which is represented graphically by enclosing data pathways, interfaces, and portions of the physical components included in the logical construct. The SDN 1700 includes an SDI 1720, LBSs 1730, and HCSs 1740. Further, a host or host platform 1750 is provided with an OS instance 1752, storage 1754, NICs 1756, and a container 1760 encapsulating the new service application 1764.

Figure 16:
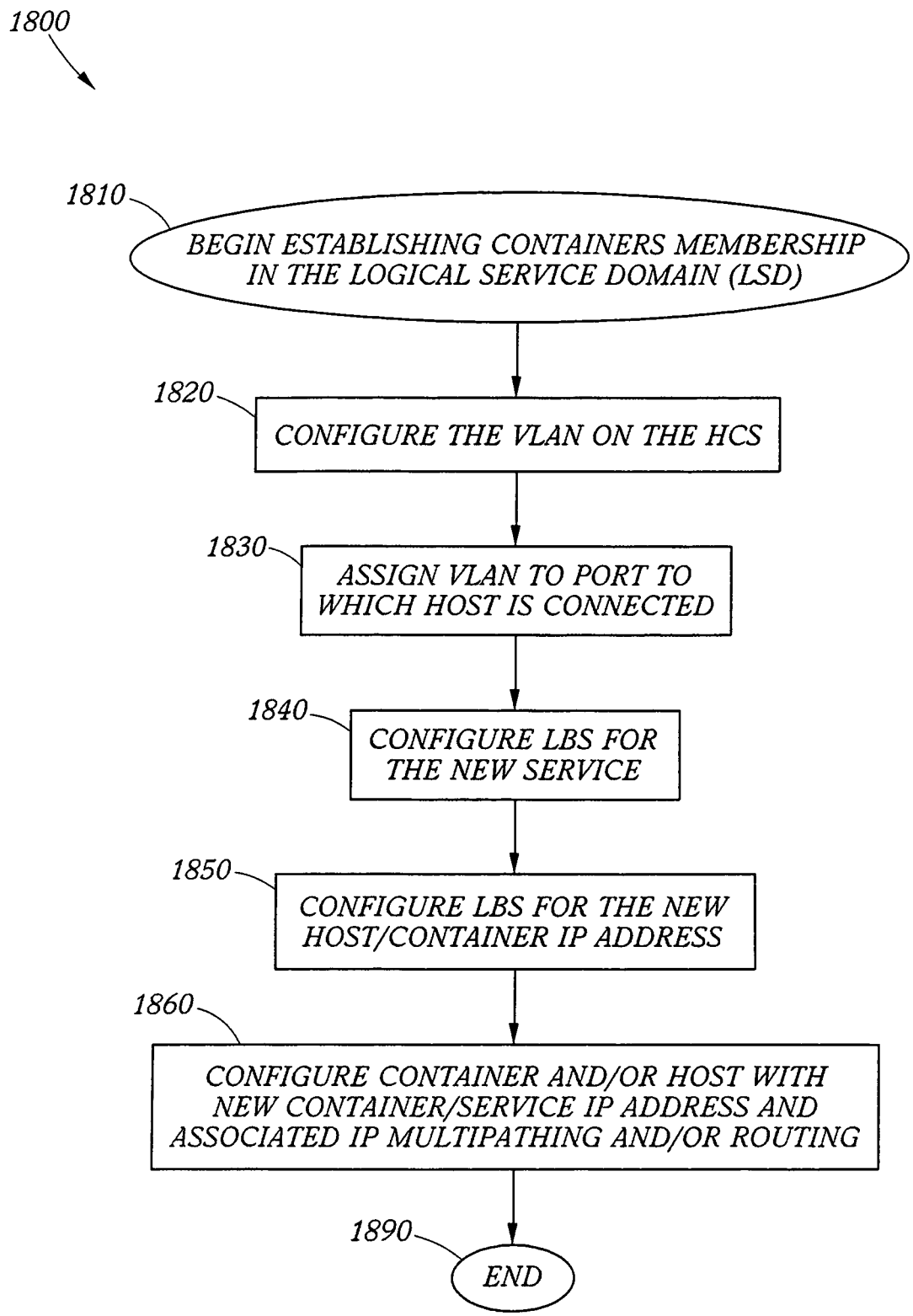
FIG. 16 is a flow chart of operation of an LSD-based network to add a new service including establishing the container containing the service application in the logical service domain.

FIG. 16 illustrates a method 1800 for establishing a container's membership in a logical service domain (LSD). The method 1800 begins at 1810 such as by identifying a new application, its resources to include in a container, and the LSD 1710 in which the service will be provided in the SDN 1700. In order for the container 1760 to be a member of the domain 1710, the method 1800 continues at 1820 with configuring the VLAN on the HCS 1740. At 1830, the VLAN is assigned to the port that the host 1750 is connected (but a host 1750 may be connected to many VLANs/ports). At 1840, the LBS 1730 is configured for the new service 1764. At 1850, the LBS is configured for the new host/container IP address. At 1860, the container 1760 and host 1750 are configured with the new container/service IP and associated IP multipathing/routing. The method 1800 ends at 1890.

I claim:

1. A method for adding a service to a service delivery network, comprising:
   receiving a request for a new service for a service delivery network, the new service being provided by a service application;
   processing the request to identify resources within the service delivery network for providing the new service, the identified resources comprising a host;
   providing a container on the host;
   configuring the container to encapsulate the service application including encapsulating resources used to provide the service application; and
   establishing membership of the container in a virtual local access network (VLAN), wherein the membership establishing comprises configuring the container for data packet communications with VLAN tagging.

2. The method of claim 1, wherein the identified resources comprise a switch and a load balancing device and wherein the membership establishing comprises configuring the VLAN on the switch including assigning the VLAN to a port to which the host is connected.

3. The method of claim 2, wherein the membership establishing comprises configuring the load balancing device for the new service and configuring the load balancing device for a network address of the container.

4. The method of claim 3, wherein the membership establishing comprises configuring the container with the network address of the container.

5. The method of claim 1, further comprising:
   receiving a second request for a new service for the service delivery network, the second new service being provided by a second service application;
   processing the second request to identify resources within the service delivery network for providing the second new service, the identified resources comprising a second host;
   providing a container on the second host;
   configuring the container on the second host to encapsulate the second service application; and establishing membership of the container on the second host in a second virtual local access network (VLAN), wherein the membership establishing comprises configuring the container for data packet communications with VLAN tagging, wherein the second VLAN differs from the VLAN, whereby the new service and the second service are provided concurrently in the service delivery network via the host and the second host.

6. The method of claim 5, wherein the resources for providing the new service and the second service comprise a switch, the switch being configured for the VLAN and the second VLAN.

7. The method of claim 5, wherein the VLAN is assigned to a first security zone defining a first set of security measures and the second VLAN is assigned to a second security zone defining a second set of security measures differing from the first set of security measures.

8. A service delivery network, comprising:
a first application configured to provide a first service;
a second application configured to provide a second service;
a pair of servers running the first application;
a pair of servers running the second application;
containers on each of the servers containing the first and second applications, the containers each encapsulating resources for providing the first and second applications;
a switch interposed between the pair of servers running the first application and interposed between the pair of servers running the second application;
a first virtual local access network (VLAN) including the containers containing the first application and the switch as members; and
a second VLAN including the containers containing the second application and the switch as members.

9. The system of claim 8, further comprising a load balancer connected to the pair of switches and configured for the addresses of the containers in the first and second VLANs.

10. The system of claim 8, wherein one of each of the pairs of servers is a host platform for the first service or the second service.

11. The system of claim 8, further comprising a third application configured to provide a third service, containers on at least two of the servers containing the third application, and a third VLAN including the containers containing the third application and the switch as members.

12. The system of claim 8, wherein at least one of the first or second VLANs is configured for VLAN tagging.

13. The system of claim 12, wherein the at least one of the first or second VLANs is not a port-based VLAN.

14. The system of claim 8, wherein the first and second VLANs are in differing security zones in which differing security levels are being applied to service communications.

15. A method for managing a service delivery network, comprising:
moving binary and configuration files associated with a service to a host;
establishing a container on the host to contain the service including encapsulating all resources used to provide the service within the container;
modifying configuration of a switch in the service delivery network for membership in a virtual local access network (VLAN);
establishing membership of the container in the VLAN; and
starting the service, wherein packets associated with the service are communicated within the service delivery network with VLAN tagging.

16. The method of claim 15, further comprising setting a load balancing switch for the service, the setting including configuring the local balancing switch for the IP address of the container.

17. The method of claim 15, further comprising assigning the VLAN to a port to which the host is connected.

18. The method of claim 15, further comprising receiving an add service command and processing the command to identify resources including the host for running the service and encapsulating all the identified resources within the container.

19. The method of claim 15, each of the packets comprises a tag indication and an identifier for the VLAN.

20. The method of claim 15, further comprising establishing a second container on the host to contain a second service, modifying the configuration of the switch for membership in a second VLAN, establishing membership of the second container in the second VLAN, and starting the second service.

\* \* \* \* \*